US007964262B2

(12) United States Patent
Brocheton et al.

(10) Patent No.: US 7,964,262 B2
(45) Date of Patent: Jun. 21, 2011

(54) LAYERED SILICATE MODIFIED CORDIERITE AND METHOD

(75) Inventors: Yves Andre Henri Brocheton, Samoreau (FR); Dilip Kumar Chatterjee, Rochester, NY (US); Michele Fredholm, Hericy (FR); Gregory Albert Merkel, Corning, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1027 days.

(21) Appl. No.: 11/823,675

(22) Filed: Jun. 28, 2007

(65) Prior Publication Data

US 2008/0057267 A1 Mar. 6, 2008

Related U.S. Application Data

(60) Provisional application No. 60/840,806, filed on Aug. 29, 2006.

(51) Int. Cl.
*B32B 3/12* (2006.01)
*B01D 24/00* (2006.01)
*B01D 39/06* (2006.01)
*B01D 39/14* (2006.01)
*C03C 3/087* (2006.01)

(52) U.S. Cl. .......... 428/116; 428/117; 428/118; 55/522; 55/523; 55/524; 501/70

(58) Field of Classification Search ........................ None
See application file for complete search history.

(56) References Cited

U.S. PATENT DOCUMENTS 3,531,307 A 9/1970 Rubin et al. .................... 106/62
3,954,672 A 5/1976 Somers et al. ................ 252/455
3,979,216 A 9/1976 Fritsch, Jr. et al. ............ 106/62
4,194,917 A 3/1980 Sakemi et al. .................. 106/62
4,451,517 A 5/1984 Inoguchi et al. .............. 428/116
4,532,228 A 7/1985 Golino et al. ................. 502/261
4,745,092 A * 5/1988 Prunier, Jr. .................... 501/119
4,869,944 A 9/1989 Harada et al. ................. 428/116
5,114,643 A 5/1992 Beall et al. ...................... 264/63
5,139,993 A 8/1992 Schmidt et al. ............... 502/325
5,275,771 A 1/1994 Bush et al. ...................... 264/63
5,334,570 A 8/1994 Beauseigneur et al. ...... 502/304
5,346,722 A 9/1994 Beauseigneur et al. ...... 427/300
6,319,870 B1 11/2001 Beall et al. .................... 501/119
6,432,856 B1 8/2002 Beall et al. .................... 501/118
RE39,120 E 6/2006 Sechi et al. ....................... 501/9
7,122,612 B2 10/2006 Tao et al. .................. 526/317.1
7,132,150 B2 11/2006 Ogunwumi et al. .......... 428/117
2005/0037147 A1 2/2005 Ogunwumi et al. ....... 427/393.6
2005/0191480 A1 9/2005 Tao et al. .................. 428/304.4
2005/0221053 A1 10/2005 Tomita et al. ................ 428/116
2005/0239640 A1 10/2005 Nilsson et al. ............... 502/202
2006/0027951 A1 2/2006 Peterson ....................... 264/631
2006/0030475 A1 2/2006 Beall et al. .................... 501/119
2007/0119133 A1 * 5/2007 Beall et al. ...................... 55/523

FOREIGN PATENT DOCUMENTS

JP 58-133810 8/1993
WO 2006/088699 8/2006
WO 2007/064497 6/2007

* cited by examiner

*Primary Examiner* — Gordon R Baldwin
(74) *Attorney, Agent, or Firm* — John L. Haack; Matthew B. McNutt

(57) ABSTRACT

The disclosure provides a composition including a porous cordierite honeycomb body as defined herein having excellent strength, high thermal shock resistance, and reduced microcrack properties. The disclosure also provides methods of making and using the composition, for example, as a catalyst carrier.

9 Claims, 12 Drawing Sheets

1.30E+06
1.20E+06
1.10E+06
1.00E+06
9.00E+05
8.00E+05
7.00E+05
Elastic Modulus (psi)
$E_{25} = E^{o}_{25}$
$E_{900} = E^{o}_{900}$
0 200 400 600 800 1000 1200 1400
Temperature (°C)

LAYERED SILICATE MODIFIED CORDIERITE AND METHOD

CROSS-REFERENCE TO RELATED CO-PENDING APPLICATION

This application is related to commonly owned and assigned application U.S. Pat App. Ser. No. 60/840,806 filed Aug. 29, 2006, entitled "NON-MICROCRACKED, THERMALLY DURABLE, POROUS CERAMICS", U.S. patent application Ser. No. 11/823,673, now U.S. Pat. No. 7,618,699.

BACKGROUND

The disclosure relates generally to compositions and to methods to make and use certain cordierite bodies, such as cordierite ceramic bodies for use as, for example, catalyst carriers having high thermal shock resistance and excellent strength.

SUMMARY

In general terms, the disclosure relates to porous cordierite bodies with improved strength and high thermal shock resistance, and to methods for making ceramic bodies and their use to form useful articles, for example, catalyst carriers, having high thermal shock resistance and excellent strength.

DETAILED DESCRIPTION

Figure 1:
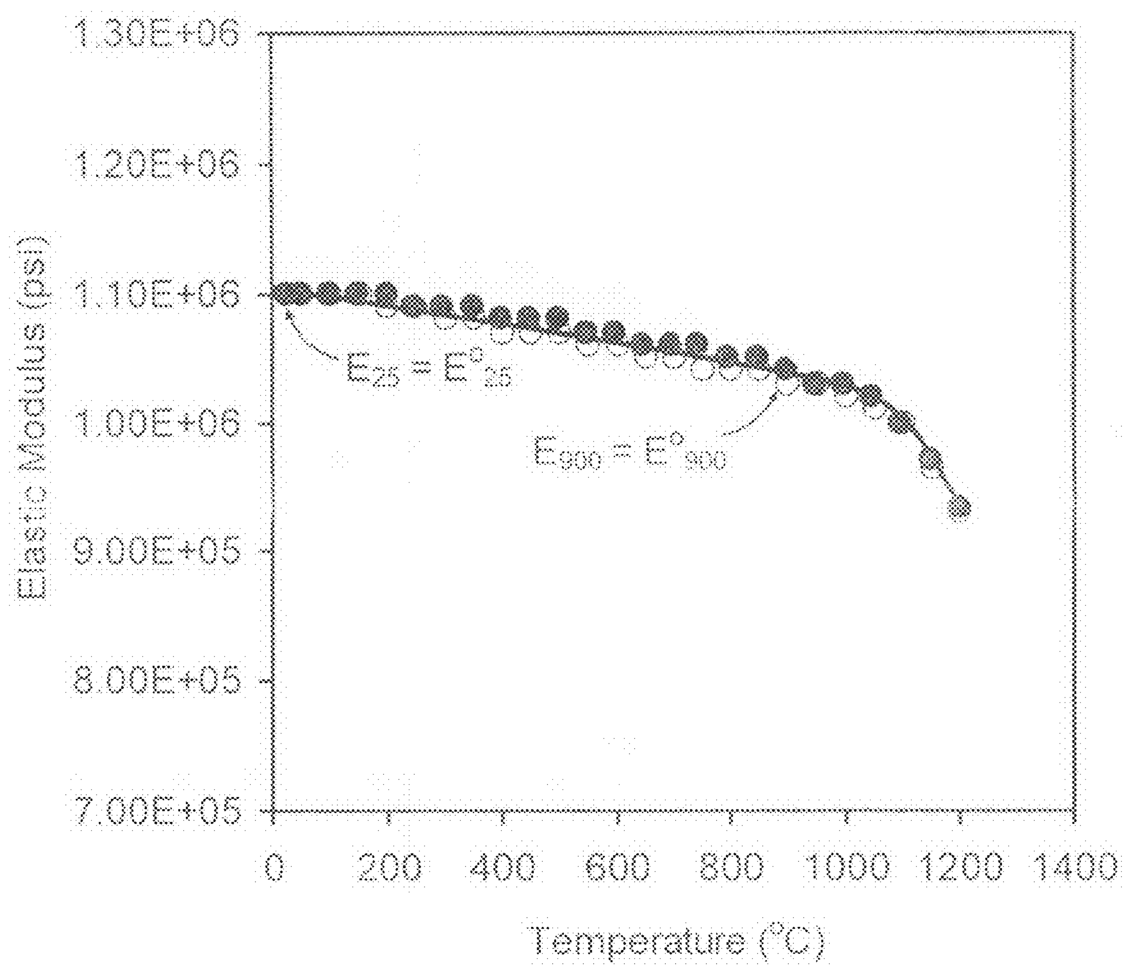
FIG. 1 shows an elastic modulus versus temperature behavior for a non-microcracked cordierite honeycomb ceramic during heating to 1,200° C. and cooling back to room temperature, in embodiments of the disclosure.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not intended to be limiting and merely set forth some of the many possible embodiments for the claimed invention.

In embodiments the disclosure provides compositions and methods for forming a porous cordierite honeycomb body that maintains high strength and exhibits little or no microcracks. The cordierite honeycomb body also maintains a high thermal shock resistance despite the increase in the coefficient of thermal expansion that occurs in the absence of microcracks.

In embodiments the disclosure provides an alkali-containing porous cordierite ceramic honeycomb body having improved strength and high thermal shock resistance. Specifically, the ceramic bodies can have, for example, at least 45% porosity; contain not less than about 0.40 wt % $M_2O$+CaO, where "wt % $M_2O$+CaO"=(wt % $Li_2O$+wt % $Na_2O$+wt % $K_2O$+wt % CaO+wt % $Rb_2O$+wt % $Cs_2O$); exhibit an MOR/CFA ratio that is not less than the quantity [3,500−40(% porosity)]; and possess a thermal shock parameter defined as $(MOR/E)_{25^\circ C.}(CTE_{500\text{-}900^\circ C.})^{-1}$ of at least 500° C. MOR is the modulus of rupture, CFA is the closed frontal area, and E is the elastic modulus as defined below.

In embodiments the disclosure provides a method for making high-strength porous cordierite bodies comprising combining at least one alkali-containing component in the raw material mixture to provide at least about 0.40 wt % $M_2O$+CaO in the fired body. In embodiments, the alkali source can be, for example, a Laponite® clay or like alkali-containing natural or synthetic layered silicate mineral.

Porous cordierite ceramic honeycomb structures having high thermal shock resistance are useful, for example, for pollution control devices such as catalytic converter substrates, selective catalytic reduction (SCR) substrates, and diesel particulate filters (DPFs). In catalytic converter and SCR substrates, porosity provides a means to "anchor" a washcoat or catalyst onto the surface, or within the interior, of the channel walls. In wall-flow DPFs, the porosity provides a pathway for the exhaust gas to permeate through the walls between the inlet and outlet channels of the filter, and may also provide space for a catalyst to reside. Historically, high thermal shock resistance in cordierite honeycomb ceramics has been achieved by maintaining a low coefficient of thermal expansion (CTE) which, in turn, is attained through microcracking and textural orientation of the cordierite crystals with their negative thermal expansion z-axes (also referred to as c-axes) oriented within the plane of the wall of the honeycomb. Examples of these approaches to attain low CTE include U.S. Pat. Nos. 3,979,216; 4,869,944; 5,114,643; and 5,275,771. In a further effort to maintain a low coefficient of thermal expansion, previous approaches have also emphasized the use of high-purity raw materials that are low in sodium, potassium, calcium, iron, etc., in order to minimize the presence of secondary phases, especially a glass phase, see for example, U.S. Pat. Nos. 3,531,307; 3,954,672; and 4,745,092.

Recent trends in exhaust after-treatment for both gasoline and diesel engines have placed greater demands on the converters and DPFs. For converters, the shift toward higher cell densities and thinner walls (e.g., 900/2) has created challenges in meeting requirements for strength and erosion resistance. More recent applications requiring low cell densities and thin walls (400/3, 300/4) for reduced back pressure may present similar challenges. Furthermore, higher porosity converters with lower thermal mass are desired for faster light-off to meet emission standards. Likewise, whereas about 50% porosity has been adequate in the past for DPFs used in retrofit applications, the move toward catalyzed DPFs requires higher porosities and coarser pore diameters to accommodate the catalyst within the porous walls, and porosities as high as 60 to 70% with pore diameters of about 15 to about 25 micrometers (μm) may be needed. The trends in both applications call for improved strength. However, high porosity and a high degree of microcracking have the undesirable effect of leading to a reduction in the strength and mechanical durability of porous, microcracked cordierite ceramics.

Another challenge faced by converters and DPFs comprised of microcracked cordierite ceramic is penetration of very fine catalyst washcoat particles into the microcracks within the cordierite matrix. The presence of particles within the microcracks interferes with the closing of the microcracks during heating, essentially pillaring the microcracks open. This results in an increase in the coefficient of thermal expansion (CTE) and also an increase in elastic modulus (E), both factors contribute to reduced thermal shock resistance. The problem can be lessened by ensuring that the washcoat resides only on the walls of the honeycomb body (see U.S. Pat. No. 4,451,517) or contains no dissolved components that could precipitate in the microcracks (see U.S. Pat. No. 5,334,570). Alternatively, others have attempted to "passivate" the filter with, for example, an aqueous buffer solution (see U.S. Pat. No. 5,346,722) or with a solution or suspension of a polymer which deposits in the microcracks prior to washcoating, see for example, U.S. Pat. Nos. 4,532,228; 5,139,993; 7,122,612; 7,132,150; and US Appln Publication Nos. 20050037147; 20050191480; and WO2006088699. This polymer prevents catalyst particles from entering the microcracks during the subsequent washcoating, and burns out during the catalyst calcination step, leaving the microcracks free to re-close during heating. However, it is also possible for very fine particles of ash and soot or dissolved components to deposit within the microcracks in DPFs during use in the diesel engine exhaust system. These particles likewise increase CTE and E modulus and reduce thermal shock resistance, and can lead to premature failure of the filter.

Although previous efforts at improving thermal shock resistance have focused on reducing the coefficient of thermal expansion, the thermal shock resistance of a ceramic material can also be improved by increasing the ratio of the strength (such as measured by the modulus of rupture) to the elastic modulus, MOR/E. The quantity MOR/E is also known as the strain tolerance of the ceramic.

In embodiments, the disclosure provides a composition and method for achieving a high-strength, high-porosity, thermal shock resistant cordierite honeycomb ceramic having an improved strain tolerance and exhibiting little or no microcracking. Various approaches have been taken in the past to improve the strength of cordierite honeycomb bodies. U.S. Pat. No. 6,319,870, demonstrated increased strength through the addition of 5-35% of a secondary phase selected from the group consisting of mullite, magnesium-aluminate spinel, and sapphirine. Examples have porosities $\leqq$37% and low CTEs that imply substantial microcracking. U.S. Pat. No. 6,432,856, relates to a cordierite body having increased strength by maintaining a median pore diameter less than 2 microns. US Patent Application Publication 2005/0239640, describes a strengthened porous ceramic body, including cordierite, by exposing the partially sintered body to a source of boron and heating the body to a sufficient temperature to increase its strength. U.S. Pat. No. 4,194,917, mentions a cordierite ceramic containing 0.3 to 8.0 weight percent of yttrium oxide or cerium oxide and exhibiting a thermal expansion coefficient less than 0.3% from 25 to 1,000° C. (i.e., $<30.7\times10^{-7}$/° C.) and less than 10% porosity. U.S. Pat. No. 6,265,334 (reissued as US RE 39,120), mentions a cordierite ceramic containing at least one element from the group consisting of an alkaline earth element other than magnesium, a rare earth element (including yttrium), gallium, and indium, precipitated along the cordierite grain boundaries, in which the ceramic has not more than 5% porosity. US Patent Application Publication 2006/0027951, described the addition of attapulgite to increase the strength of a clay-free cordierite-forming body in the 300 to 900° C. temperature range during firing to reduce cracking. US Patent Application Publication 2006/0030475, mentions the addition of an attapulgite clay to increase the final strength of the fully fired ceramic body.

The high-porosity cordierite bodies of the disclosure exhibit a substantially improved strength relative to cordierite bodies prepared by the same procedure but of lower alkali content. Additionally, the inventive bodies display an increased strain tolerance and a reduced amount of microcracking, while maintaining a high thermal shock parameter. Furthermore, unlike methods for making low-microcracked cordierite bodies that require a clay-free batch, the method of the disclosure allows the use of, for example, either coarse or fine kaolin clay in the raw material mixture, which improves the plasticity of the batch and reduces the likelihood of cracking during firing.

The physical properties of the bodies of the disclosure enable the fabrication of converter substrates having, for example, very thin walls, low cell densities for reduced back pressure, reduced thermal mass (faster light-off), or both. The preparative methods of the disclosure also allow higher porosities to be achieved in converter substrates for further reduction in thermal mass or for storage of high amounts of catalyst (such as for selective catalytic reduction (SCR)) while maintaining sufficient strength. The preparative methods of the disclosure also enable higher porosities in DPFs for higher catalyst loadings while maintaining low pressure drop and high body strength.

The reduction in microcracking in the bodies of the disclosure may obviate the need for a passivation step prior to firing, especially for DPFs. Additionally, the reduction in microcracks reduces the risk of a progressive deterioration in thermal durability of DPFs during use due to accumulation of ash and soot in the microcracks when the body is used as a diesel particulate filter. Finally, the bodies of the disclosure preserve a high thermal shock resistance despite the decrease in microcracking and increase in CTE, due the increase in strain tolerance (MOR/E) accompanying the addition of alkali to the batch.

The coefficient of thermal expansion, CTE, is measured by dilatometry along the axial direction of a specimen, which is the direction parallel to the lengths of the honeycomb channels. The value of $CTE_{500\text{-}900^\circ\,C.}$ is the mean coefficient of thermal expansion from 500 to 900° C., and the value of $CTE_{25\text{-}800^\circ\,C.}$ is the mean coefficient of thermal expansion from 25 to 800° C., both as measured during heating of the sample. In embodiments, a lower value of CTE for a given value of MOR/E is desirable for high thermal shock resistance.

The modulus of rupture, MOR, refers to the flexural strength of a honeycomb body as measured at room temperature by a four-point bending method on a bar whose length is parallel to the axial direction of the honeycomb. A high value of MOR is desirable for mechanical durability.

The closed frontal area, CFA, of the sample is defined as the fraction of the total cross sectional area that is comprised of the ceramic walls of the honeycomb, and is defined by the relation $CFA=t(2L-t)/L^2$, where t is the thickness of the honeycomb wall and L is the distance between the centers of the wall intersections, in which $L=(\text{cell density})^{-1/2}$. The cell density is the number of channels per unit area of the face of the honeycomb.

The ratio of modulus of rupture to closed frontal area, MOR/CFA, provides a measure of the intrinsic strength of the ceramic walls. This ratio is useful for normalizing the strengths of ceramic honeycombs and allows the direct comparison of strengths of honeycomb ceramics having different cell geometries. The value of MOR/CFA is approximately the value of the MOR of a solid non-cellular bar of that ceramic having otherwise the same microstructure.

The elastic modulus, E, also known as Young's modulus, is a measure of the rigidity of the honeycomb body. For a given amount of thermally induced strain (dimensional change relative to the original dimensions), a higher elastic modulus results in a higher stress. Thus, a lower elastic modulus promotes higher thermal shock resistance (TSR) for a given strength and CTE. The elastic modulus can be measured by a sonic resonance technique along the axial direction of the specimen. The value $E_{25^\circ C.}$ is the elastic modulus of the specimen at room temperature before heating, and $E_{900^\circ C.}$ is the elastic modulus measured at 900° C. during heating. The ratio of $E_{900^\circ C.}/E_{25^\circ C.}$ is proportional to the amount of microcracking in the cordierite ceramic.

The quantity $(MOR/E)_{25^\circ C.}$ is the ratio of modulus of rupture to elastic modulus (MOR/E) with both properties measured at about 25° C., and is also referred to as the strain tolerance at room temperature. A high MOR/E is desirable to afford increased mechanical durability and thermal shock resistance.

The % porosity of a body is the volume percentage of porosity of the ceramic as measured by mercury porosimetry. In embodiments the % porosity of a body can be, for example, from at least about 45 to about 80%, from about 50 to about 75%, and from about 55 to about 70%.

The axial XRD I-ratio, $I_A$, is a measure of the degree of textural orientation of the cordierite crystallites in the ceramic microstructure. The axial I-ratio is measured by x-ray diffractometry on the axial cross section of the honeycomb, that is, the cross section orthogonal to the length of the channels, and is defined by the relationship:

$$I\text{-ratio}=I(110)/\{I(110)+I(002)\} \quad \text{EQ. 1}$$

where I(110) and I(002) are the peak heights of the XRD reflections from the (110) and (002) planes in the cordierite crystal lattice, based upon hexagonal indexing of the XRD peaks, using copper $K_\alpha$ radiation. The axial I-ratio provides a quantitative measure of the degree to which the cordierite crystallites in the honeycomb article are oriented with their negative thermal expansion z-axes parallel to the plane of the honeycomb wall. A high degree of such orientation is desirable because it reduces the CTE of the honeycomb article in both the axial direction (within the plane of the wall, parallel to the lengths of the channels) and radial direction (within the plane of the wall, orthogonal to the lengths of the channels). For randomly oriented cordierite crystals, the axial I-ratio is approximately 0.655. Values of the axial I-ratio lower than 0.65 indicate that the cordierite crystals are preferentially oriented with their c-axes parallel to the plane of the wall. Such orientation increases the thermal shock resistance of the article by lowering the CTE in the axial and radial directions.

The thermal shock parameter, TSP, is an indicator of the durability of the honeycomb body under thermal shock conditions, that is, conditions under which the body is non-uniformly heated to high temperatures. More specifically, TSP refers to the predicted maximum temperature difference the body can withstand without fracturing when the coolest region of the body is at about 500° C. Thus, for example, a calculated TSP=558° C. implies that the maximum temperature at some position within the honeycomb body must not, exceed 1,058° C. when the coolest temperature at some other location within the body is 500° C. The predicted thermal shock resistance, TSR, of the body is defined as TSR=TSP+500° C. A high value of TSP or TSR is desired for higher thermal shock durability for the ceramic.

The indefinite article "a" or "an" and its corresponding definite article "the" as used herein means at least one, or one or more, unless specified otherwise.

"Include," "includes," or like terms means including but not limited to.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

"Consisting essentially of" in embodiments refers to, for example, a composition, a method of making the composition, a method of using the composition to make ceramic bodies, or to articles of the disclosure, and can include the components or steps listed in a claim, plus other components or steps that do not materially affect the basic and novel properties of the compositions, articles, and methods of use of the disclosure, such as a particular composition, a particular layered silicate, a particular metal oxide or mixed metal oxide, or like structure, material, or process variables selected. Items that may materially affect the basic properties of the components or steps of disclosure or may impart undesirable characteristics to the present disclosure include, for example, decreased durability of the composition or ceramic body, decreased filter capacity of the composition or ceramic body, decreased thermal shock resistance of the composition or ceramic body, and like characteristics.

In embodiments, the composition, the articles, or the methods of the present disclosure preferably eliminate or avoid such undesirable characteristics. Thus, the disclosure may suitably comprise, consist of, or consist essentially of any of: a composition as defined herein; a composition of the reaction product including a cordierite and an alkali source material, as defined herein; a method of making the composition, as defined herein; or a method of using the composition, as defined herein.

Specific and preferred values listed below for ingredients, additives, compositions, alternatives thereto, and ranges, are for illustration only; they do not exclude other defined values or other values within defined ranges for ingredients, additives, compositions, or alternatives thereto. The ingredients, additives, compositions, or alternatives thereto, of the disclosure include compositions having any combination of the values, specific values, more specific values, and preferred values described herein.

The abovementioned ingredients, additives, compositions, alternatives thereto, and like materials of the disclosure, can include a salt or salts thereof. The compositions of the disclosure can be prepared as described and illustrated herein, by procedures analogous thereto, or by many similar or different procedures, including modifications or adaptations of procedures mentioned in the publications or patents.

In embodiments of the disclosure the addition of alkali or alkali-containing materials, such as alkali-containing layered silicate compositions of certain clays, to high porosity cordierite bodies was found to provide a product having fewer microcracks and reduced microcracking tendency. The addition of alkali increases the strength, MOR, and the strain tolerance, MOR/E, of the resulting cordierite bodies. The bodies have a greater mechanical durability compared to cordierite bodies of similar pore microstructure but of lower alkali content. A reduction in microcracking and an increase in glass phase are believed to result in an increase in the coefficient of thermal expansion. However, this CTE increase is effectively offset by the increase in strain tolerance, so that the thermal shock resistance, as indicated by the calculated values of TSP and TSR, remains high.

In embodiments, the disclosure provides an alkali-containing porous cordierite ceramic honeycomb body that exhibits at least one of high porosity, improved strength, a high thermal shock resistance, reduced microcracking, or combinations thereof. In embodiments, the ceramic microstructure of the bodies can exhibit a greater proportion of the cordierite crystallites oriented with their crystallographic z-axes parallel to the plane of the honeycomb wall than with their z-axes orthogonal to the plane of the wall.

In embodiments, a ceramic body of the disclosure can exhibit porosities, for example, of at least 45%, 50%, 55%, 60%, 65%, 70%, 75%, and 80% including intermediate percent values and ranges thereof, can contain not less than about 0.40 wt % $M_2O$+CaO, where "wt % $M_2O$+CaO"=(wt % $Li_2O$+wt % $Na_2O$+wt % $K_2O$+wt % CaO+wt % $Rb_2O$+wt % $Cs_2O$) or the sum total weight percent of any of $Li_2O$, $Na_2O$, $K_2O$, CaO, $Rb_2O$, or $Cs_2O$; can exhibit an MOR/CFA ratio (psi) that is not less than the quantity {3,500−40(% porosity)}; and can possess a thermal shock parameter (TSP) defined as $(MOR/E)_{25° C.}(CTE_{500\text{-}900° C.})^{-1}$ of at least 500° C. In embodiments, the body can also exhibit a strain tolerance, MOR/E, of at least 0.100% ($0.1\times10^{-2}$). In embodiments, the body can be characterized either by an elastic modulus ratio of $E_{900° C.}/E_{25° C.}$ of not more than 1.00 as measured in the axial direction of the honeycomb during heating, or by a "microcrack parameter," $Nb^3$, of not more than about 0.08.

In embodiments, the disclosure provides a method for quantifying the degree of microcracking in ceramic bodies, such as a cordierite ceramic. For a non-microcracked cordierite body, the elastic modulus gradually decreases with increasing temperature. This decrease in the elastic modulus is believed to be attributable to the increasing distance between atoms within the crystal structure with increasing temperature. An example of the decrease in elastic modulus with increasing temperature for a porous, non-microcracked cordierite honeycomb body is depicted in FIG. 1. FIG. 1 shows the elastic modulus versus temperature behavior for a non-microcracked cordierite honeycomb ceramic during heating to 1,200° C. (open circles) and cooling back to room temperature (filled circles). The near overlap of the heating and cooling trend lines signifies a virtual absence of microcracks. The elastic modulus decrease is essentially linear from room temperature to 900° C., with a ratio $E_{900}/E_{25}$=0.936. Above about 1,000° C., there is a greater rate of decrease in elastic modulus with increasing temperature. This is believed to be due to the softening, or even partial melting, of a small amount of residual glass phase that originally formed by reaction of impurities during sintering of the ceramic. Surprisingly, the rate of change in the elastic modulus with heating for a non-microcracked cordierite ceramic, $\Delta E°/\Delta T$, was found to be proportional to the value of the elastic modulus of the non-microcracked body at room temperature, $E°_{25}$, and is closely approximated by the relation of equation 2:

$$\Delta E°/\Delta T=-7.5\times10^{-5}(E°_{25° C.}) \quad \text{EQ. 2}$$

The superscript "°" elastic modulus term (E°) denotes the elastic modulus of the ceramic in a non-microcracked state. Based upon EQ. 2, one can calculate the ratio of the elastic modulus of a non-microcracked cordierite body at 900° C. to that of a non-microcracked cordierite body at 25° C. as being $E°_{900° C.}/E_{25° C.}=1+875(-7.5\times10^{-5})=0.934$. This value of $E°_{900° C.}/E°_{25° C.}$ provides a baseline against which to compare the $E_{900° C.}/E_{25° C.}$ value of a microcracked ceramic body. For non-microcracked cordierite bodies, and most other non-microcracked ceramics, the temperature dependence of the elastic modulus during cooling after heating to a high temperature, such as 1,200° C., is essentially identical to the temperature dependence during the original heating, so that, at any given temperature, the value of the elastic modulus during cooling is nearly the same as its value at that temperature during heating. This is also illustrated in FIG. 1 for a non-microcracked cordierite ceramic.

Figure 2:
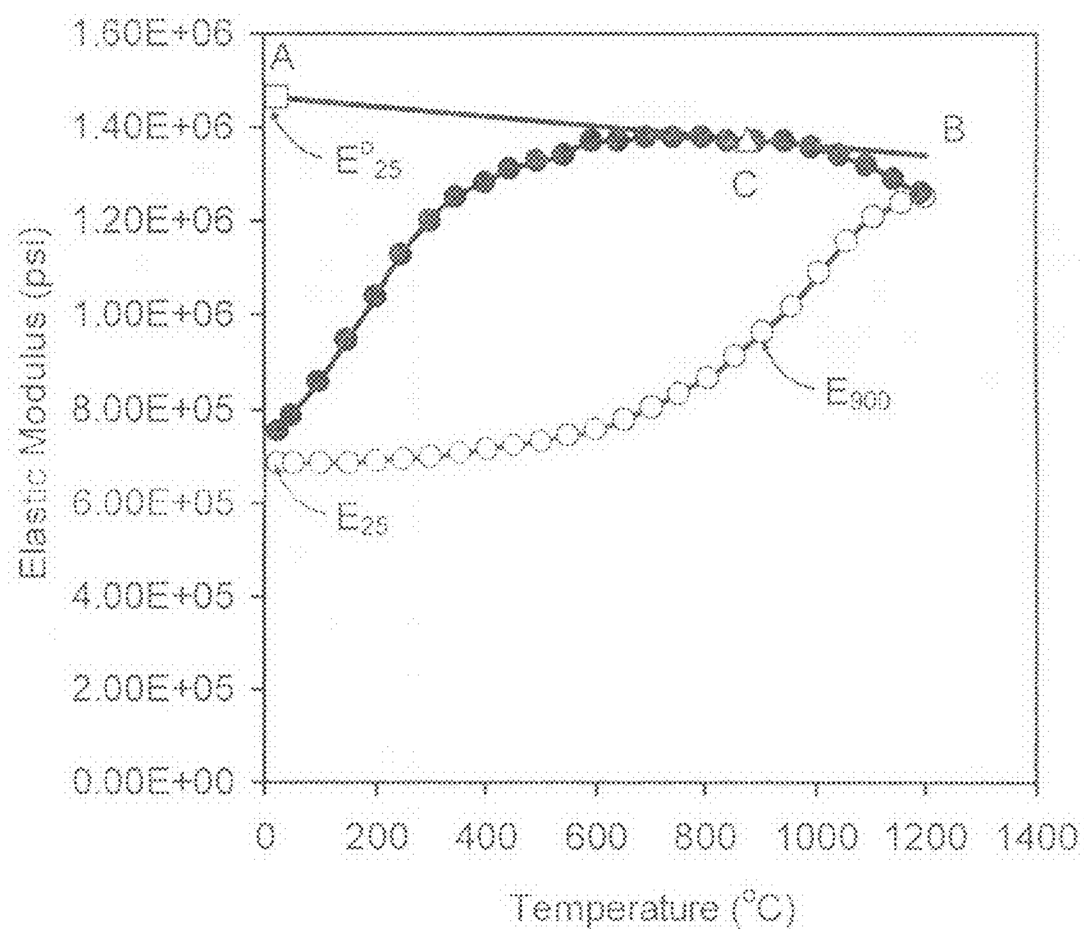
FIG. 2 shows the elastic modulus versus temperature behavior for a microcracked cordierite honeycomb ceramic during heating and cooling, in embodiments of the disclosure.

An example of the temperature dependence of the elastic modulus for a highly microcracked cordierite ceramic is displayed in FIG. 2. Thus, FIG. 2 shows the elastic modulus versus temperature behavior for a microcracked cordierite honeycomb ceramic during heating to 1,200° C. (open circles) and cooling back to room temperature (filled circles). Line A-B represents a tangent to the elastic modulus cooling curve at point C (open triangle) where the slope of the curve is equal to $-7.5\times10^{-5}(E°_{25})$, and $E°_{25}$ is the value of the tangent line at room temperature.

The elastic modulus increases gradually, and then more steeply, with increasing temperature up to 1,200° C. This increase is believed to be due to the re-closing, and eventual annealing, of the microcracks with heating, so that the ceramic body has progressively fewer open microcracks at higher temperatures. The increase in E due to the reduction in microcracking more than offsets the decrease in E of the individual cordierite crystallites with heating, resulting in a more rigid body at high temperature. As the ceramic is cooled from 1,200° C., the microcracks do not immediately re-open, because micro-stresses are initially too low. As a result, the trend in elastic modulus with cooling is initially that of a non-microcracked cordierite body. The increase is steep at first due to the increase in viscosity of any liquid or glass phase, possibly accompanied by a reduction in volume fraction of the liquid or glass due to crystallization or devitrification, respectively. Between about 1,000 and 800° C. in the example in FIG. 2, the more gradual increase in E with decreasing temperature can be ascribed to the natural increase in the elastic modulus of the cordierite crystals with cooling. At temperatures below about 800° C., the elastic modulus undergoes a gradual, then more rapid, decrease with cooling. This is due to the progressive re-opening of the microcracks and a decrease in the rigidity of the ceramic. At room temperature, the elastic modulus has returned to a value close to the initial value of the ceramic before the thermal cycle to 1,200° C.

The extent of microcracking in the cordierite ceramic is reflected in two features of the elastic modulus heating and cooling curves. One manifestation of the degree of microcracking is the extent to which the elastic modulus increases from 25° C. to 900° C. during heating, as this increase is believed to be caused by a re-closing of the microcracks. For example, in FIG. 2, the ratio of $E_{900}/E_{25}$ for the heating curve is 1.412. This value is much higher than the value of 0.934 that would be expected in the complete absence of microcracking. Thus, the value of $E_{900}/E_{25}$ for a cordierite ceramic may be utilized as a quantitative measure of the extent of microcracking in the room-temperature body. In accordance with embodiments of the disclosure, the value of $E_{900}/E_{25}$ is not more than 1.00.

In embodiments the $E_{900}/E_{25}$ upon heating can be, for example, less than or equal to 1.0, 0.98, 0.96, and like values including intermediate values and ranges thereof.

Another indication of the degree of microcracking is the gap between the elastic modulus heating and cooling curves. A method to quantify this hysteresis is based upon the construction of a tangent to the cooling curve in a temperature region where the sample is still in a non-microcracked state. In FIG. 2, such a tangent is shown as line A-B, and the point of tangency is denoted by point "C". The slope of the tangent line is, therefore, equivalent to the temperature dependence of the elastic modulus of the non-microcracked cordierite body, as constrained by EQ. 2. Furthermore, the value of this tangent line extrapolated back to room temperature (point A) is approximately equivalent to the room-temperature elastic modulus of the sample if it were not microcracked at room temperature, and is equal to $E°_{25}$ for that sample. Thus, the equation of the tangent line is given by the following general expression:

$$E°_{tangent}=(E°_{25})\{1-7.5\times10^{-5}(T-25)\} \quad \text{EQ. 3}$$

The inventors have devised an analytical method for determining $E°_{25}$ from the experimental measurements of the elastic modulus during cooling, after heating to about 1,200° C. In accordance with this method, a second-order polynomial is fit to the elastic modulus measurements made during cooling between about 1,000 and 500° C., as a function of temperature (° C.). This equation is of the following form:

$$E=c+b(T)+a(T^2) \quad \text{EQ. 4}$$

The upper limit of the temperature range over which the experimentally measured elastic modulus values are fit by EQ. 4 may be further restricted to a temperature less than 1,000° C. if it is determined that the trend in E versus temperature exhibits a very high curvature at, or below, about 1,000° C., due to, for example, softening of a glass phase or formation of a small amount of liquid. Likewise, the lower limit of the temperature range over which the experimentally measured elastic modulus values are fit by EQ. 4 may be further restricted to a temperature greater than 500° C. if it is determined that the trend in E versus temperature exhibits a very high curvature at, or above, about 500° C., due to, for example, reopening of the microcracks. The method of least-squares regression analysis is used to derive the values of the regression coefficients "a," "b," and "c" in EQ. 4.

The value of $E°_{25}$ is obtained by solving for the elastic modulus and temperature at which the tangent line, given by EQ. 3, intersects the polynomial curve fit to the elastic modulus data during cooling, given by EQ. 4. The values of the elastic modulus and temperature at this point of intersection are denoted $E_i$ and $T_i$, respectively. In the example in FIG. 2, the values of $E_i$ and $T_i$ correspond to the triangle, point C. Because this point of intersection is common to both the tangent line and the polynomial curve, it follows that $$E_i=(E°_{25})\{1-7.5\times10^{-5}(T_i-25)\}=c+b(T_i)+a(T_i^2) \quad \text{EQ. 5}$$

Also, at the point of tangency; the slope of the polynomial curve must equal that of the tangent line. Therefore, it follows that $$(E°_{25})(-7.5\times10^{-5})=b+2a(T_i) \quad \text{EQ. 6}$$

EQ. 5 and EQ. 6 provide two equations relating the two unknown quantities, $E°_{25}$ and $T_i$, to one another. To solve for $E°_{25}$ and $T_i$, EQ. 6 is first rearranged to yield $$(E°_{25})=\{b+2a(T_i)\}/(-7.5\times10^{-5}) \quad \text{EQ. 7}$$

EQ. 7 is then substituted into EQ. 5 to give the following expression:

$$\{\{b+2a(T_i)\}/(-7.5\times10^{-5})\}\{1-7.5\times10^{-5}(T_i-25)\}=c+b(T_i)+a(T_i^2) \quad \text{EQ. 8}$$

EQ. 8 may be rearranged to yield the following:

$$0=\{c+b(T_i)+a(T_i^2)\}-\{\{b+2a(T_i)\}/(-7.5\times10^{-5})\}\{1-7.5\times10^{-5}(T_i-25)\} \quad \text{EQ. 9}$$

Gathering terms in EQ. 9 gives the following relation:

$$0=\{c-\{b/(-7.5\times10^{-5})\}\{1+7.5\times10^{-5}(25)\}\}+(T_i)(b)-(T_i)\{2a/(-7.5\times10^{-5})\}\{1+7.5\times10^{-5}(25)\}-(T_i)\{\{b/(-7.5\times10^{-5})\}\{-7.5\times10^{-5}\}\}+(T_i^2)\{a-\{2a/(-7.5\times10^{-5})\}(-7.5\times10^{-5})\} \quad \text{EQ. 10}$$

Further simplifying EQ. 10 yields $$0=\{c-\{b/(-7.5\times10^{-5})\}\{1+7.5\times10^{-5}(25)\}\}+(T_i)\{-2a/(-7.5\times10^{-5})\}\{1+7.5\times10^{-5}(25)\}+(T_i^2)(-a) \quad \text{EQ. 11}$$

EQ. 11 may be re-expressed as $$0=C+B(T_i)+A(T_i^2) \quad \text{EQ. 12}$$

where $C=\{c-\{b/(-7.5\times10^{-5})\}\{1+7.5\times10^{-5}(25)\}\}$, $B=\{-2a/(-7.5\times10^{-5})\}\{1+7.5\times10^{-5}(25)\}$, and $A=-a$. The value of $T_i$ can then be found by solving the quadratic formulas:

$$T_i=\{-B+\{B^2-4(A)(C)\}^{0.5}\}/2A \quad \text{EQ. 13}$$

$$T_i=\{-B-\{B^2-4(A)(C)\}^{0.5}\}/2A \quad \text{EQ. 14}$$

EQ. 13 and EQ. 14 provide two possible values of $T_i$, of which only one will have a physically realistic value, that is, a value lying between 25 and 1,200° C. The physically realistic value of $T_i$ computed in this manner is then substituted into EQ. 7, from which the value of $E°_{25}$ is calculated.

Once $E°_{25}$ has been solved for, the ratio of the elastic modulus for the hypothetically non-microcracked sample at 25° C., $E°_{25}$, to the actual measured value of the elastic modulus of the microcracked sample at 25° C., $E_{25}$, is proportional to the degree of microcracking in the initial sample before heating. That is, a greater degree of microcracking at room temperature will lower the value of $E_{25}$, and thereby raise the value of $E°_{25}/E_{25}$.

Modeling of the relationship between elastic modulus and microcracking has provided a relationship between the ratio $E°_{25}/E_{25}$ and the quantity $Nb^3$, where N is the number of microcracks per unit volume of ceramic and b is the diameter of the microcracks (see D. P. H. Hasselman and J. P. Singh, "Analysis of the Thermal Stress Resistance of Microcracked Brittle Ceramics," *Am. Ceram. Soc. Bull.,* 58 (9) 856-60 (1979).) Specifically, this relationship may be expressed by the following equation:

$$Nb^3=(9/16)\{(E°_{25}/E_{25})-1\} \quad \text{EQ. 15}$$

Figure 12:
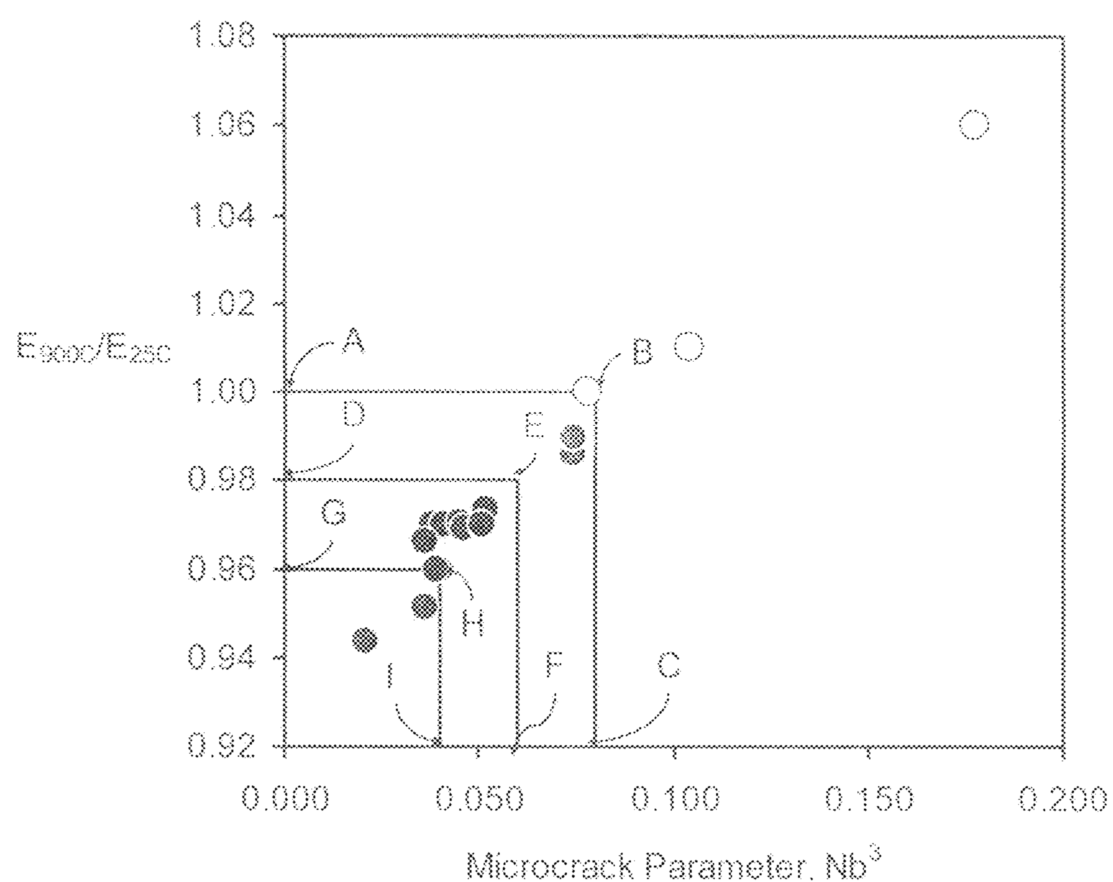
FIG. 12 shows and compares the strain tolerance, $E_{900^\circ C.}/E_{25^\circ C.}$ vs. Microcrack parameter, $Nb^3$ values of bodies, in embodiments of the disclosure.

Although based upon a number of simplifying assumptions, the quantity $Nb^3$, referred to herein as the "Microcrack Parameter", provides another useful means to quantify the degree of microcracking in a ceramic. For a non-microcracked body, the value of $Nb^3$ is 0.00. In the example in FIG. 2, the value of $Nb^3$ is 0.64. It was experimentally determined that the ratio $E_{900° C.}/E_{25° C.}$ is directly proportional to $Nb^3$, and that a value of $E_{900° C.}/E_{25° C.}\leqq 1.00$ approximately corresponds to a value of $Nb^3\leqq 0.08$ (see FIG. 12). Thus, in embodiments of the disclosure, the value of $E_{900° C.}/E_{25° C.}$ cannot be more than 1.00 or the value of $Nb^3$ cannot be more than 0.08.

Figure 3:
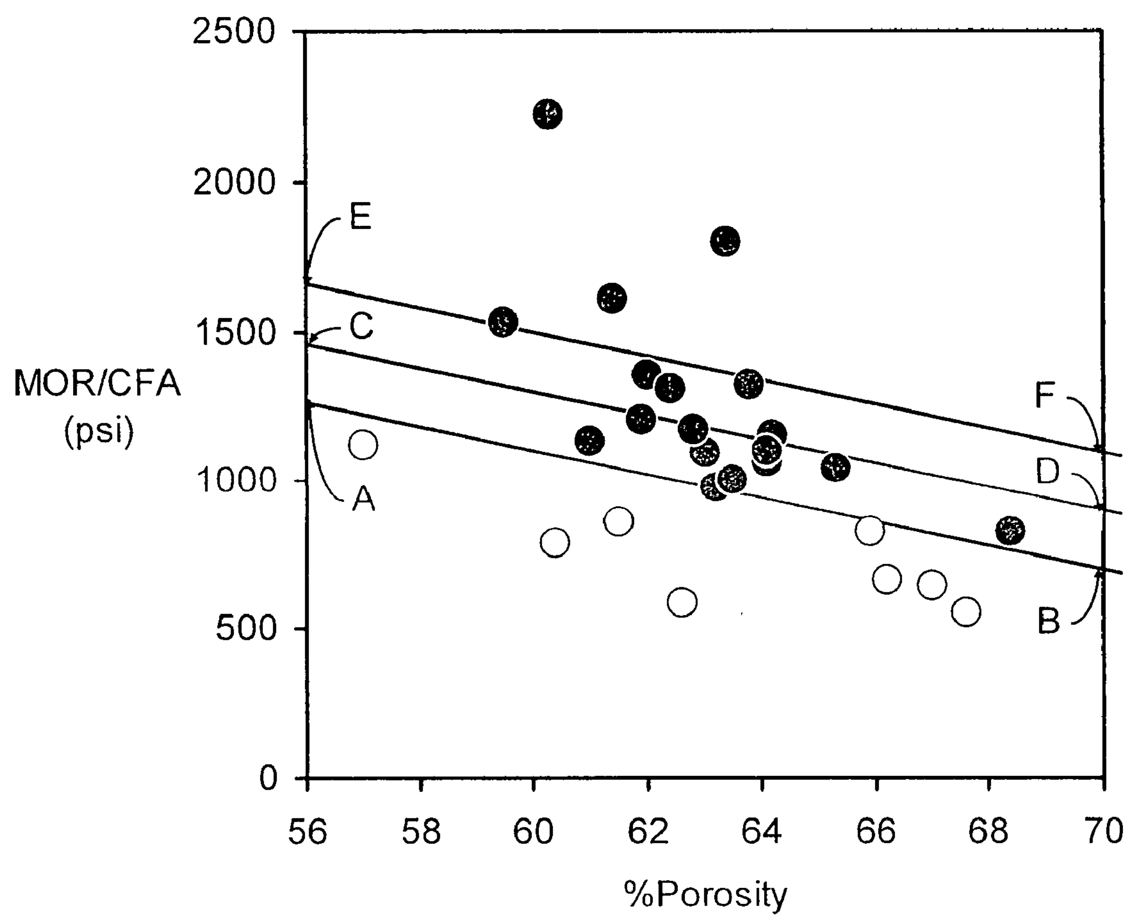
FIG. 3 shows the ratio of the flexural strength to closed frontal area, MOR/CFA, versus % porosity for bodies and for comparison bodies of lower alkali content, in embodiments of the disclosure.

In embodiments, the disclosure provides a number of preferred ranges for the properties of the ceramic body. In embodiments, the MOR/CFA ratio of the bodies of the disclosure can be greater than or equal to the quantity {3,500–40(% porosity)}, greater than or equal to at least {3,700–40(% porosity)}, or greater than or equal to at least {3,900–40(% porosity)}, as shown in FIG. 3. FIG. 3 shows the ratio of the flexural strength to closed frontal area, MOR/CFA, versus % porosity for inventive bodies (filled circles) and for comparison bodies of generally lower alkali content (open circles). Line A-B denotes the lower limits of MOR/CFA of the inventive bodies, and lines C-D and E-F denote the lower limits of particularly useful compositions in embodiments.

Figure 4:
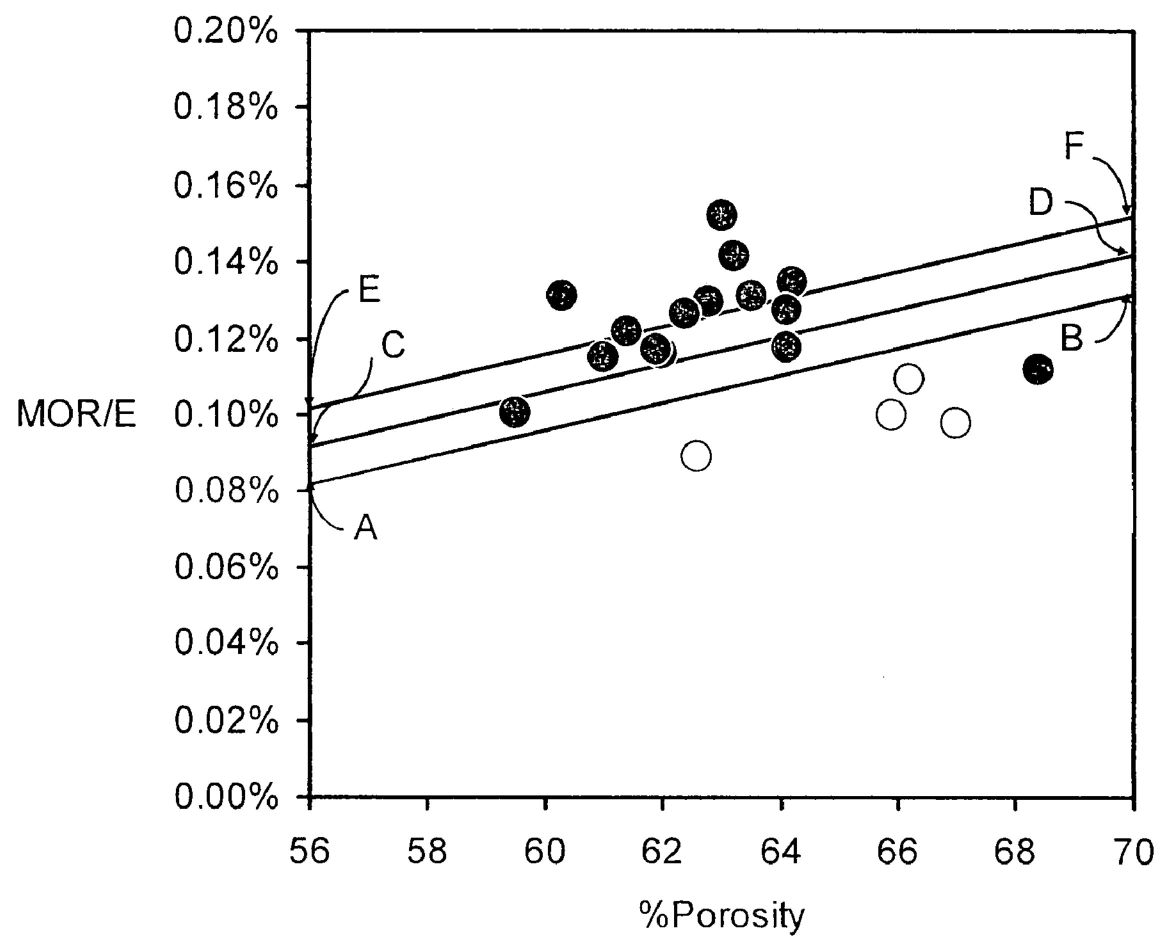
FIG. 4 shows the strain tolerance, MOR/E, versus % porosity for bodies and for comparison bodies of lower alkali content in embodiments of the disclosure.

The ratio of MOR/E, or strain tolerance, expressed as a percentage, can be for example, at least {0.01+0.00142(% porosity)}, at least {0.025+0.00142(% porosity)}, or at least {0.04+0.00142(% porosity)}, as shown by the ranges in FIG. 4. FIG. 4 shows the strain tolerance, MOR/E, versus % porosity for inventive bodies (filled circles) and for comparison bodies of lower alkali content (open circles). Lines A-B, C-D, and E-F denote the lower limits of MOR/E of certain embodiments.

The thermal shock parameter, $TSP=(MOR/E)_{25° C.}(CTE_{500\text{-}900° C.})^{-1}$, can be for example, at least 500° C., at least 550° C., at least 600° C., at least 700° C. and including intermediate values and ranges thereof. A higher thermal shock parameter is desired since a higher calculated thermal shock parameter corresponds to a higher thermal shock resistance of the ceramic.

Figure 9:
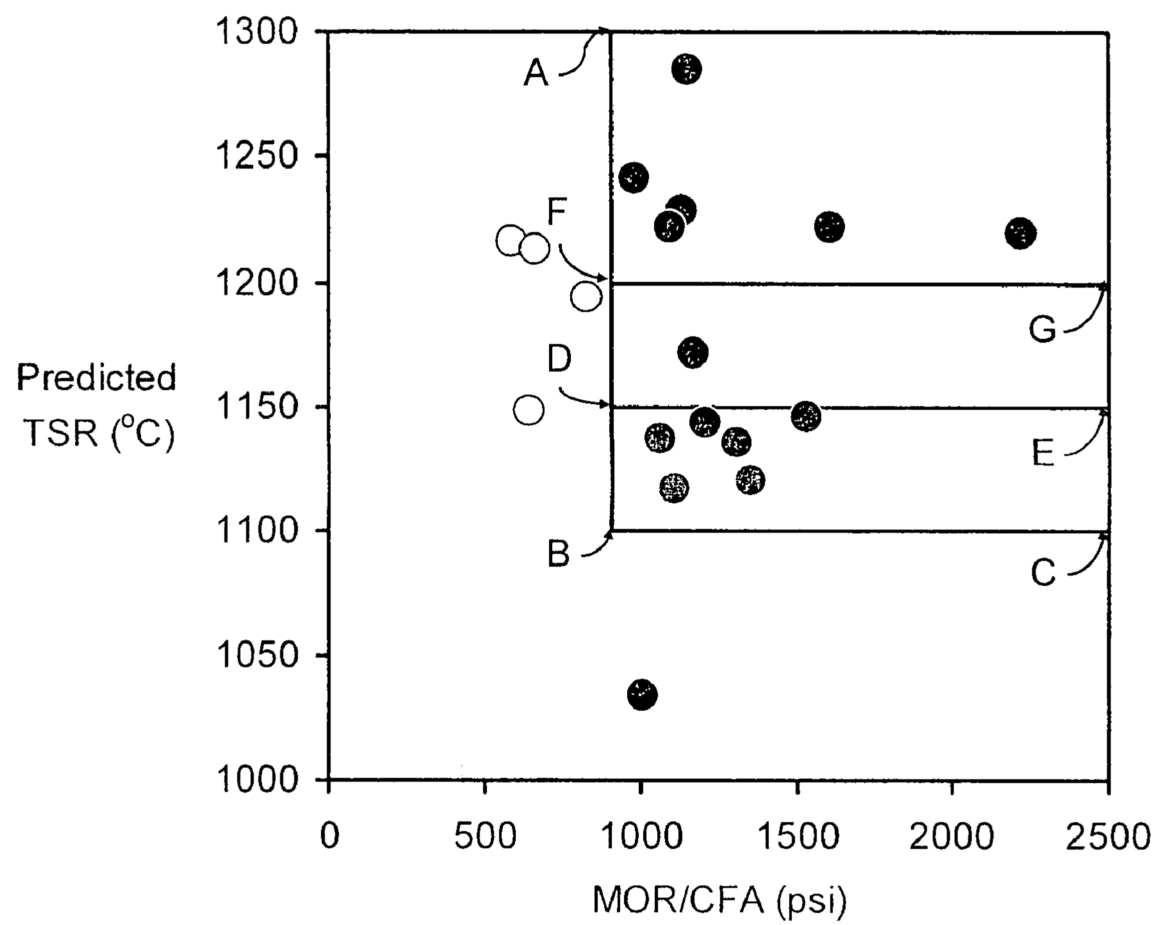
FIG. 9 shows a plot of the predicted thermal shock resistance, TSR versus the MOR/CFA values for bodies and comparison body examples, in embodiments of the disclosure.

In embodiments, the disclosure provides for a MOR/CFA of at least 800 psi and the predicted thermal shock resistance (TSP+500° C.) of at least 1,100° C. (to upper right of region A-B-C in FIG. 9). FIG. 9 shows a plot of the predicted thermal shock resistance, TSR, versus the MOR/CFA values for inventive (filled circles) and comparison (open circles) examples, in certain embodiments. Regions A-B-C, F-D-E, and A-F-G denote preferred combinations of high strength and high thermal shock resistance in certain embodiments. Further, the MOR/CFA can be at least 1,000 psi and the predicted thermal shock resistance can be at least 1,150° C. (to upper right of region F-D-E in FIG. 9). Still further, the MOR/CFA can be at least 1,200 psi and the predicted thermal shock resistance can be at least 1,200° C. (to upper right of region A-F-G in FIG. 9).

In embodiments, the disclosure provides for ceramic bodies having an axial I-ratio of, for example, not more than about 0.55, not more than about 0.50, not more than about 0.45, and like ratios, including intermediate values and ranges thereof. A lower axial I-ratio indicates a greater proportion of the cordierite crystals are oriented with their negative-CTE z-axes within the plane of the wall, which imparts a lower CTE to the honeycomb body in both the axial and radial directions, and increases the thermal shock resistance of the body.

Figure 5:
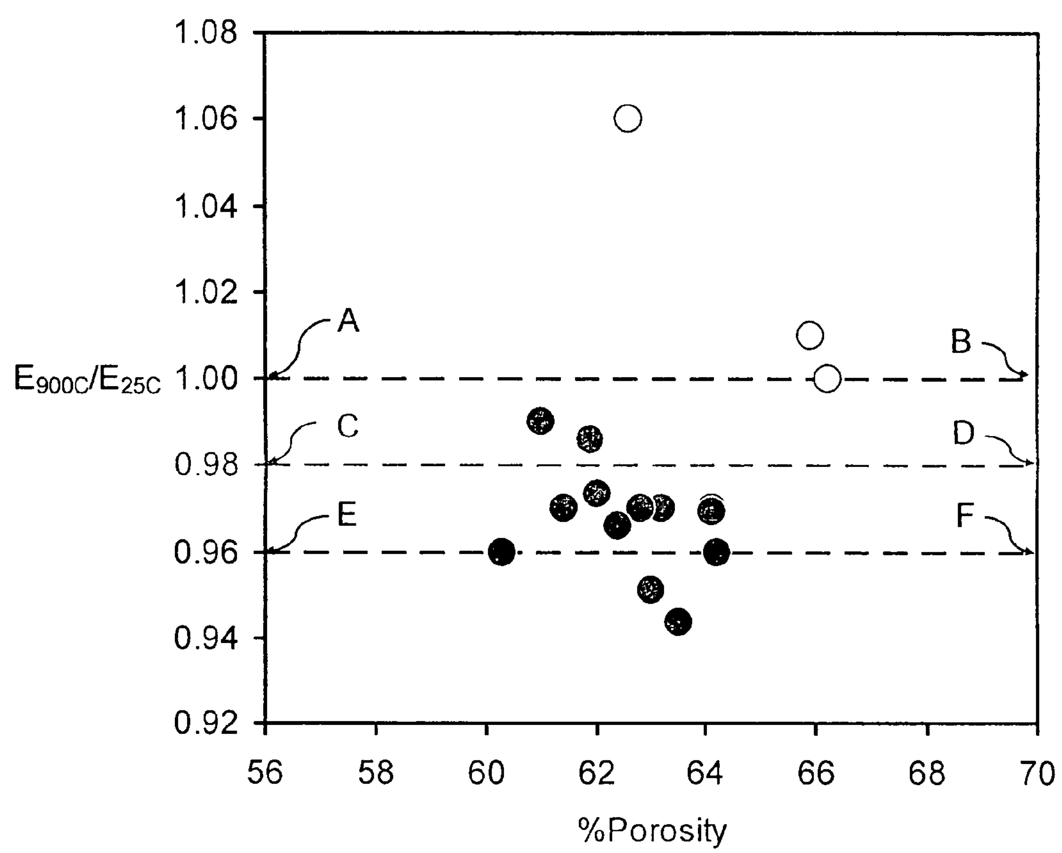
FIG. 5 shows the ratio $E_{900^\circ C.}/E_{25^\circ C.}$, versus % porosity for bodies and for comparison bodies of lower alkali content, in embodiments of the disclosure.

In embodiments, the disclosure provides for ceramic bodies having a ratio of $E_{900° C.}/E_{25° C.}$, for example, of not more than about 1.00, 0.99, 0.98, 0.97, 0.96, 0.95, or 0.94, including intermediate values and ranges thereof. Some of these desired ranges are shown in FIG. 5. FIG. 5 shows the ratio $E_{900° C.}/E_{25° C.}$, versus % porosity for inventive bodies (filled circles) and for comparison bodies of lower alkali content (open circles). Dashed lines denote the upper limits of $E_{900° C.}/E_{25° C.}$ in certain embodiments.

Figure 6:
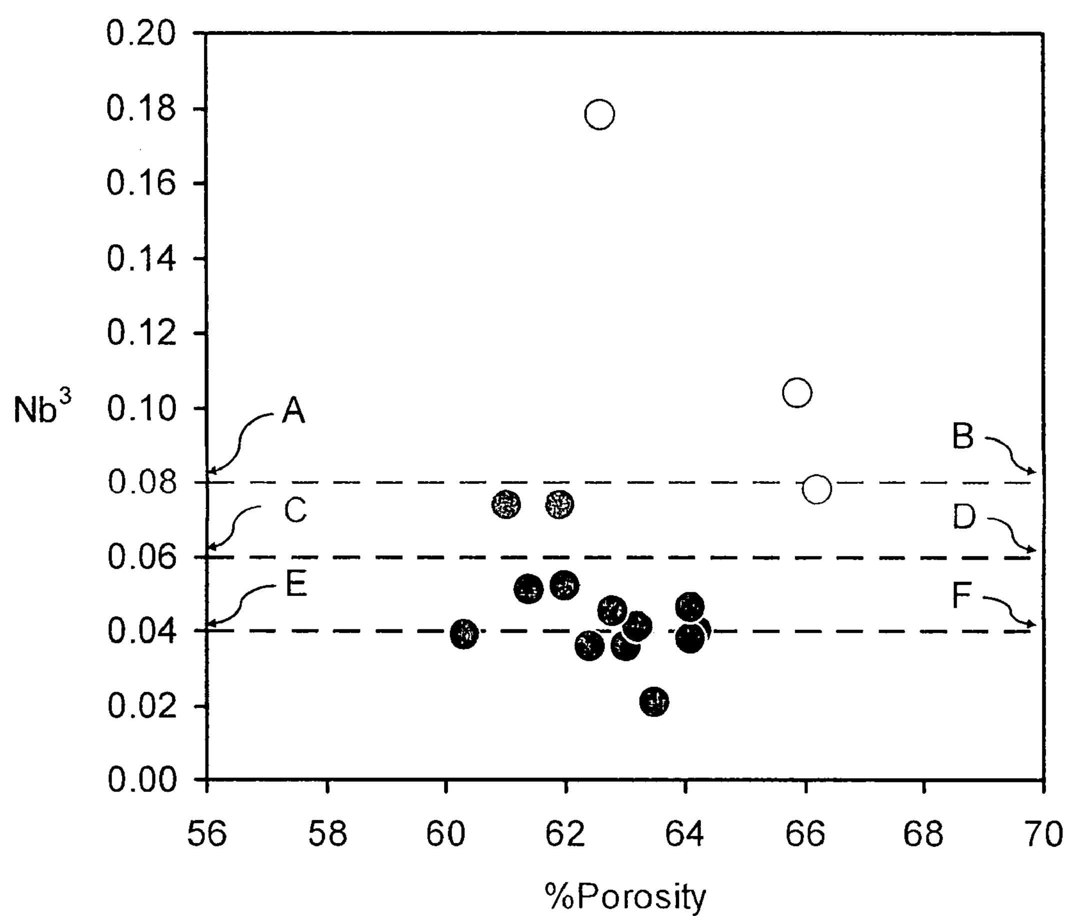
FIG. 6 shows the microcrack parameter, $Nb^3$, versus % porosity for bodies and for comparison bodies of lower alkali content, in embodiments of the disclosure.

In embodiments, it may be desired that the quantity $Nb^3$ be not more than about 0.08, not more than 0.07, not more than 0.06, not more than 0.05, not more than 0.04, or not more than 0.03, including intermediate values and ranges thereof. Some of these preferred ranges are shown in FIG. 6. FIG. 6 shows the microcrack parameter, $Nb^3$, versus % porosity for inventive bodies (filled circles) and for comparison bodies of lower alkali content (open circles). Dashed lines denote the upper limits of $Nb^3$ for certain embodiments.

Lower values of $E_{900° C.}/E_{25° C.}$ and $Nb^3$ correspond to lower degrees of microcracking. Less microcracking promotes higher strength, higher strain tolerance, and less dependence of the thermal shock resistance on environmental factors such as air-born or water-born particulates that could enter the microcracks and prevent their closure during heating, or chemical attack on the microcracks that could cause them to grow to greater dimensions and reduce the strength of the body.

Figure 10:
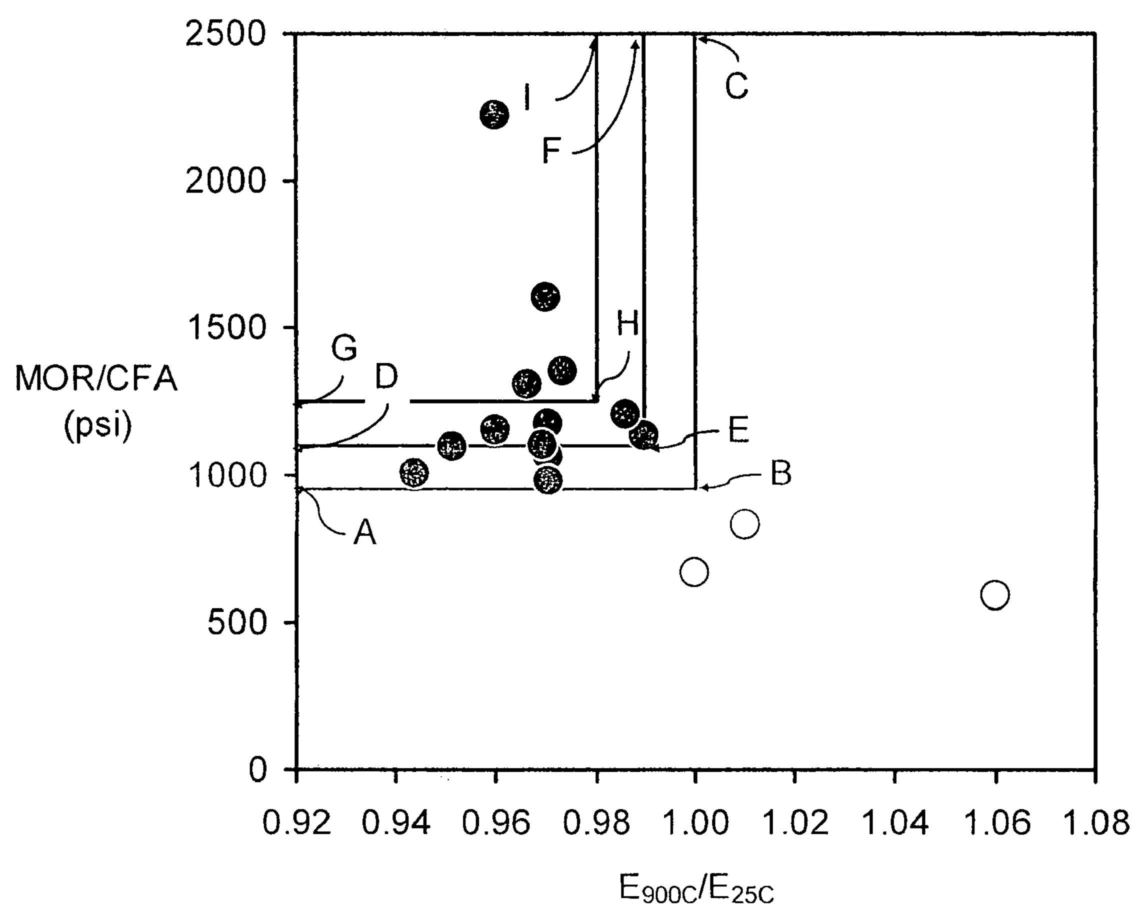
FIG. 10 shows a plot of MOR/CFA vs. $E_{900^\circ C.}/E_{25^\circ C.}$ for bodies and comparison bodies, in embodiments of the disclosure.
Figure 11:
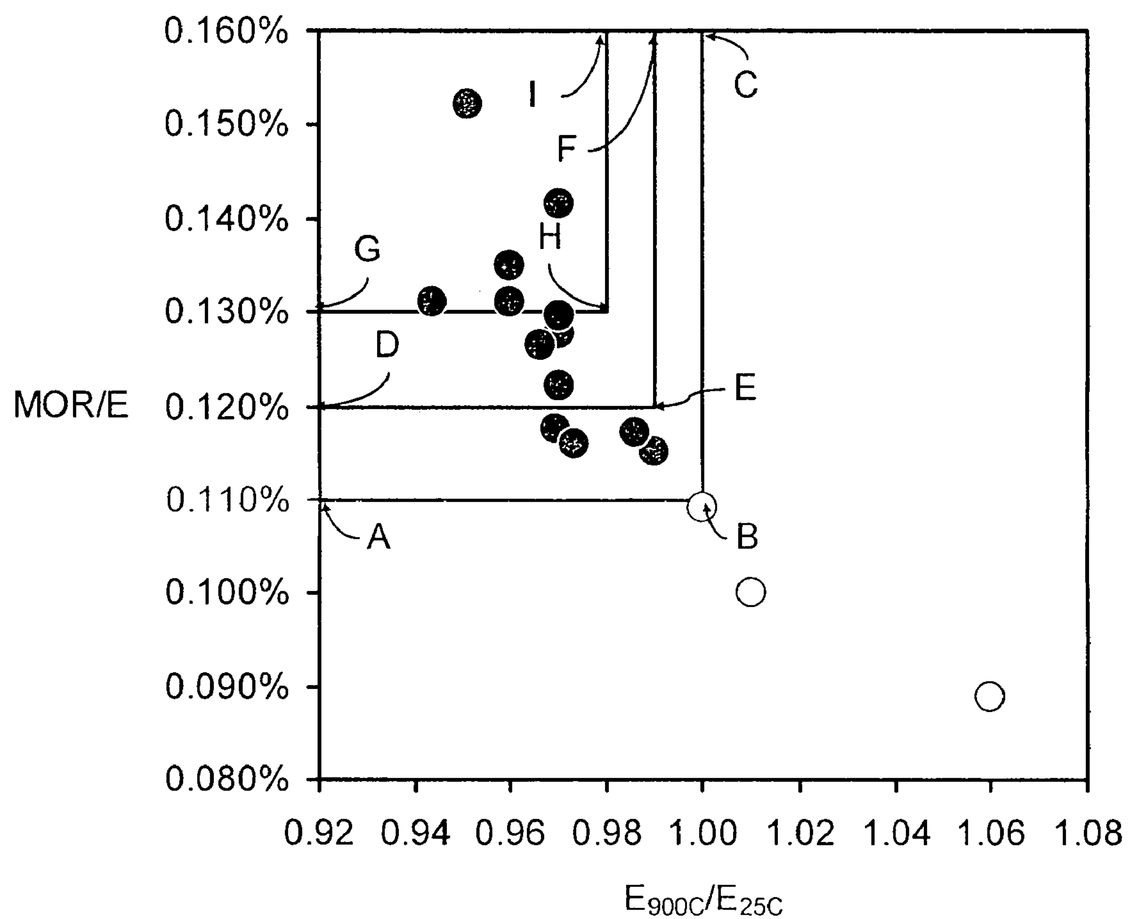
FIG. 11 shows a plot of MOR/E vs. $E_{900^\circ C.}/E_{25^\circ C.}$ for bodies and comparison bodies, in embodiments of the disclosure.

In embodiments, the disclosure provides for ceramic bodies having combinations of high MOR/CFA with low $E_{900° C.}/E_{25° C.}$ and high MOR/E with low $E_{900° C.}/E_{25° C.}$. FIG. 10 shows a plot of MOR/CFA vs. $E_{900° C.}/E_{25° C.}$ for inventive (filled circles) and comparison (open circles) examples, that demonstrates the benefit of low values of $E_{900° C.}/E_{25° C.}$ for achieving high strength, in embodiments. Regions A-B-C, D-E-F, and G-H-I denote preferred combinations in certain embodiments. FIG. 11 shows and compares the strain tolerance, MOR/E vs. values of $E_{900° C.}/E_{25° C.}$ for inventive (filled circles) and comparison (open circles) examples, and demonstrates the benefit of low values of $E_{900° C.}/E_{25° C.}$ for achieving high strain tolerance. Regions A-B-C, D-E-F, and G-H-I denote preferred combinations in embodiments.

Some specific combinations include, for example, MOR/CFA≧950 psi and $E_{900° C.}/E_{25° C.}\leqq 1.00$, MOR/CFA≧1,100 psi and $E_{900° C.}/E_{25° C.}\leqq 0.99$, and MOR/CFA≧1,250 psi and $E_{900° C.}/E_{25° C.}\leqq 0.98$, as shown in FIG. 10 by regions A-B-C, D-E-F, and G-H-I, respectively. Still other specific combinations include, for example, MOR/E≧0.110% and $E_{900^\circ C.}/E_{25^\circ C.} \leqq 1.00$, MOR/E≧0.120% and $E_{900^\circ C.}/E_{25^\circ C.} \leqq 0.99$, and MOR/E≧0.130% and $E_{900^\circ C.}/E_{25^\circ C.} \leqq 0.98$, as shown in FIG. 11 by regions A-B-C, D-E-F, and G-H-I, respectively.

In embodiments of the disclosure, to provide high thermal shock resistance to the ceramic bodies the mean axial CTE from 25 to 800° C. is, for example, not more than about $12\times10^{-7}$/° C., or not more than about $11\times10^{-7}$/° C., or even not more than about $10\times10^{-7}$/° C. or $9\times10^{-7}$/° C., and like values, intermediate values and ranges thereof. The mean CTE from 500 to 900° C. is, for example, not more than about $20\times10^{-7}$/° C., or not more than about $18\times10^{-7}$/° C., or even not more than about $17\times10^{-7}$/° C. or $16\times10^{-7}$/° C., and like values, intermediate values and ranges thereof.

In embodiments, the disclosure provides for ceramic bodies having a total porosity, for example, of at least about 58%, of at least about 60%, of at least about 64%, or of at least about 66%, and like values, intermediate values and ranges thereof. In embodiments, the disclosure provides for ceramic bodies having a median pore diameter, for example, of at least about 16 microns, of at least about 18 microns, of at least about 20 microns, or of at least about 22 microns, and like values, intermediate values and ranges thereof. The value of the $d_{90}$ pore diameter can be, for example, less than about 90 microns, less than about 70, less than about 50, and less than about 35 microns, and like values, intermediate values and ranges thereof. The value of the $d_{10}$ pore diameter can be at least about 8 microns, at least about 9 microns, or at least about 10 microns, and like values, intermediate values and ranges thereof. The pore diameters were measured by mercury porosimetry. The terms $d_{10}$, $d_{50}$, and $d_{90}$ denote the pore diameters, in microns (i.e., micrometers, $10^{-6}$ meters), at which about 10%, about 50%, and about 90%, respectively, of the total pore volume are of a finer pore diameter. Thus, for example, $d_{90}$ is the pore diameter at which about 90% (by volume) of the pores have a smaller diameter (equal to the pore diameter at which the cumulative mercury intrusion volume equals 10% of the total mercury intrusion volume). It therefore follows that, for example, $d_{10}<d_{50}<d_{90}$.

Figure 7:
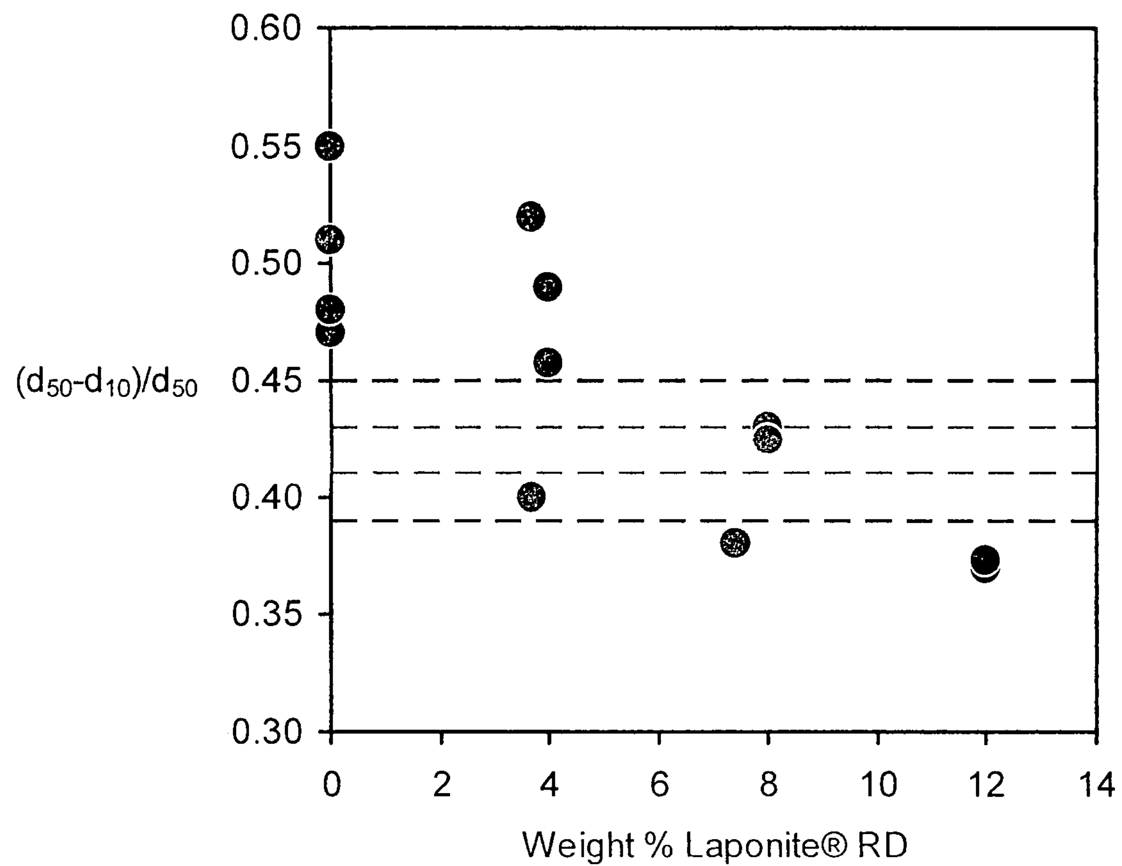
FIG. 7 shows the value of $d_f=(d_{50}-d_{10})/d_{50}$ versus weight percent Laponite® RD for certain bodies as tabulated in Tables 5 and 6, in embodiments of the disclosure.

In embodiments, the disclosure provides examples demonstrating that the addition of alkali to the ceramic bodies decreases the value of $d_f=(d_{50}-d_{10})/d_{50}$, which is a measure of the width of the fine end of the pore size distribution (FIG. 7). FIG. 7 shows the value of $d_f=(d_{50}-d_{10})/d_{50}$ versus weight percent Laponite® RD for certain bodies as tabulated in Tables 5 and 6. Dashed lines denote the upper limits of $d_f$ in certain embodiments. Lower values of $d_f$ are desirable because they correlate with a lower pressure drop in the soot-loaded state when the body is used, for example, as a diesel particulate filter. Thus in embodiments, the value of $d_f$ can be, for example, less than about 0.45, less than about 0.43, less than about 0.41, or less than about 0.39, including like values, intermediate value and ranges thereof.

In embodiments, the disclosure provides for a ceramic body having a "mercury pore connectivity factor," MPCF of, for example, at least 30%, at least 40%, at least 45%, at least 50%, at least 55%, and even at least 60%, including like values, intermediate value and ranges thereof, where MPCF=(% porosity)/$\{(d_{90}-d_{10})/d_{50}\}$, in which % porosity, $d_{10}$, $d_{50}$, and $d_{90}$ are all determined by mercury porosimetry of the bulk ceramic wall. A high value for the MPCF is desirable because high values of MPCF are associated with high values of MOR/E and thermal shock resistance when the cordierite ceramic also possesses a low degree of microcracking.

Figure 8:
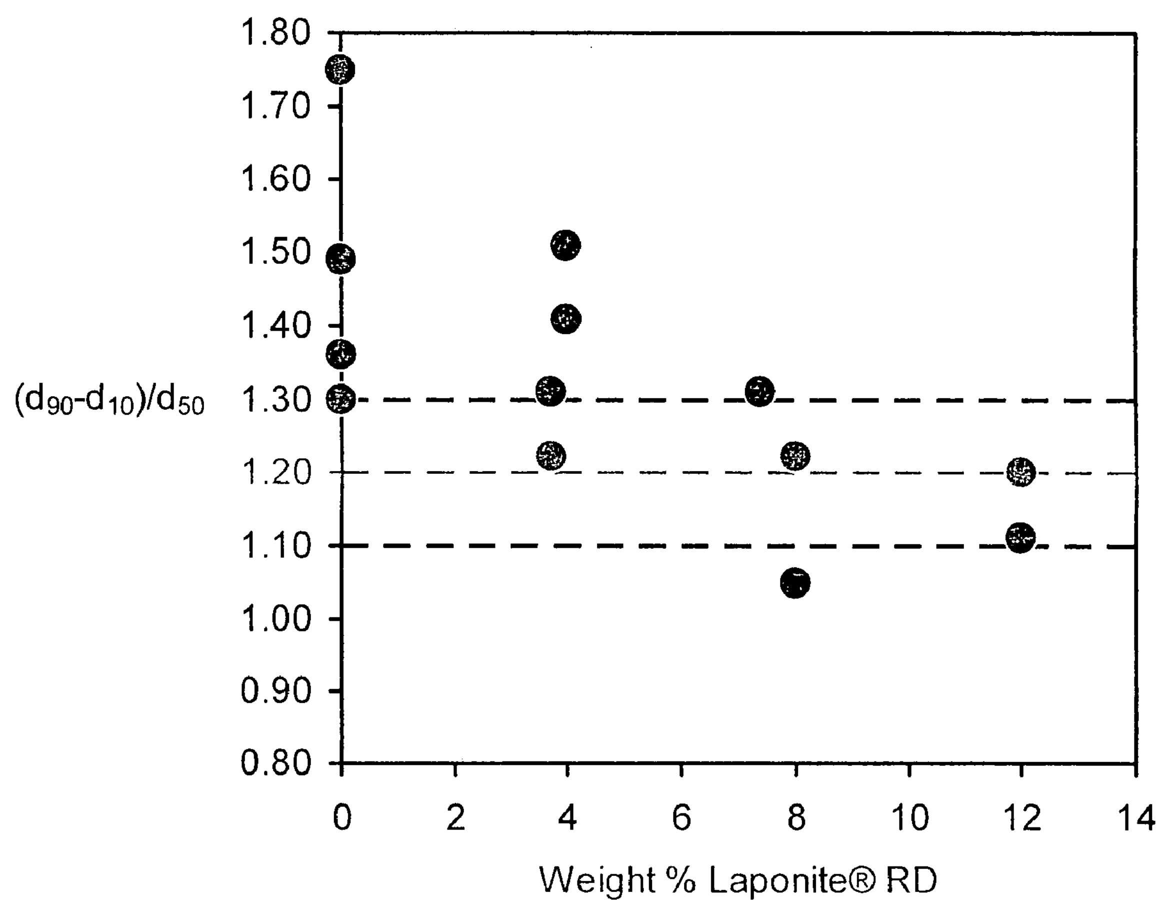
FIG. 8 shows the value of $d_b=(d_{90}-d_{10})/d_{50}$ versus weight percent Laponite® RD for bodies of Tables 5 and 6, in embodiments of the disclosure.

In embodiments, the disclosure provides examples demonstrating that the addition of alkali to the ceramic bodies decreases the value of $d_b=(d_{90}-d_{10})/d_{50}$, which is a measure of the overall width of the pore size distribution (FIG. 8). FIG. 8 shows the value of $d_b=(d_{90}-d_{10})/d_{50}$ versus weight percent Laponite® RD for bodies of Tables 5 and 6. Dashed lines denote the upper limits of $d_b$ in certain embodiments. Lower values of $d_b$ correspond to narrower pore size distributions and are desirable for increasing the "mercury pore connectivity factor" and providing higher values of strain tolerance and thermal shock resistance. In embodiments, the value of $d_b$ can be less than about 1.30, less than about 1.20, or less than about 1.10, including like values, intermediate values and ranges thereof.

In embodiments, the combined weight percentages of the mullite, spinel, sapphirine, and corundum phases in the cordierite ceramic body, as measured by x-ray diffractometry, can be less than about 5%, or less than about 4%, and like values. Higher amounts of these crystalline phases increase CTE without substantially increasing MOR/E, which can decrease thermal shock resistance.

Method of Making

In embodiments, the disclosure provides a method for making a high-porosity cordierite ceramic body containing, for example, at least about 0.40 weight percent $M_2O$+CaO (total alkali metal oxide+calcium oxide based on the total weight of the ceramic body) and having improved strength, high thermal shock resistance, and reduced microcracking, the method comprising, for example, combining an alkali-containing source, such as a solution, a compound, or a composition of an alkali source material, with a mixture of cordierite-forming raw materials and optionally having a binder, solvent, lubricant, pore-forming agent, or combination thereof; forming the resulting mixture into an anisotopic body; and firing the body to a temperature sufficient to form a cordierite ceramic article. The cordierite-forming raw materials can comprise, for example, a talc or calcined talc, an alumina-forming source, a silica-forming source, and optionally a kaolin clay or calcined kaolin clay.

All particle diameters herein are based upon a particle volume distribution as measured by laser diffraction on a suspension of the powders in a liquid, such as in water or isopropyl alcohol or a mixture thereof, using a particle size analyzer, such as a Model FRA9200 or Model S3000 Microtrac particle analyzer (products of Microtrac Inc.). The median particle diameter is thus the particle diameter at which 50% of the particles are of a smaller diameter, and 50% are of a larger diameter, based upon cumulative particle volume.

Alkali Source

In embodiments, the alkali-containing compound can be, for example, a soluble or dispersible alkali-containing material, such as a natural or synthetic colloidal clay, including but not limited to smectite, palygorskite, sepiolite, attapulgite, hectorite, bentonite, montmorillonite, or ball clay, or combinations thereof; a soluble alkali silicate or alkali silicate solution; an alkali-containing silicate or alumino-silicate crystalline phase, such as a feldspar, nepheline, spodumene, petalite, mica, zeolite, or like materials, and combinations thereof; or an alkali-containing silicate or aluminosilicate glass, or like amorphous phase; and combinations of the aforementioned alkali-containing compounds or materials. In embodiments, the alkali source can be an organic dispersant, binder, plasticizer, or like alkali-containing organic material, and combinations thereof. In embodiments, the alkali source can be an alkali salt such as an alkali halide, carbonate, nitrate, sulfate, or like alkali-containing salt, and combinations thereof. One excellent alkali source material is, for example, a synthetic colloidal layered silicate, such as the commercially available Laponite® from Southern Clay Products. For additional definitions, descriptions, and methods of silica materials and related metal oxide materials, including clays, see for example, R. K. Iler, *The Chemistry of Silica*, Wiley-Interscience, 1979. In embodiments, the alkali source preferably has a low solubility in the solvent used to form the green body.

Talc Source

In embodiments, the median particle diameter of the talc sources can be, for example, less than about 35 microns, for example, from about 5 to about 30 microns, and in embodiments can be, from about 10 to about 25 microns. In embodiments, the talc can have a platy particle morphology, such that the talc has an XRD talc morphology index from about 0.6 to about 1.0. Talc having a very platy morphology will have a high morphology index. The talc morphology index can be, for example, at least about 0.85. Talc having a platy particle shape or morphology promotes the growth of cordierite crystals having their negative-expansion z-axes in the plane of the wall, which can lower the CTE in the axial and radial directions of the honeycomb article. The value of the XRD talc morphology index can be, for example, from 0.0 to about 1.0, and is proportional to the aspect ratio, or platy character, of the talc particles. The talc morphology index is measured by x-ray diffractometry on a talc powder that is packed into the x-ray diffraction sample holder to maximize the orientation of the talc within the plane of the sample holder, as described in U.S. Pat. No. 5,258,150. The XRD talc morphology index, M, is defined by the relationship:

$$M=I(004)/\{I(004)+I(020)\} \quad \text{EQ. 16}$$

where I(004) and I(020) are the x-ray intensities of the (004) and (020) reflections as measured by Cu Kα radiation. When the talc is provided as a calcined talc, the morphology index refers to that of the talc powder prior to being calcined.

Alumina-Forming Source

Alumina-forming sources are compounds capable of forming $Al_2O_3$ upon heating, and include, for example, corundum, a transition alumina such as gamma-alumina and rho-alumina, bohemite, and gibbsite, or like materials, and combinations thereof. In embodiments, the median particle diameter of the alumina-forming sources, averaged in proportion to their weight percentages in the raw material mixture, can be, for example, at least about 3 microns, at least about 5, at least about 6, at least about 8 microns, and like diameters including intermediate values and ranges thereof.

Silica-Forming Source

In embodiments, the median particle diameter of the silica-forming source can be, for example, less than about 35 microns, such as from about 5 to about 30 microns, or from about 10 to about 25 microns. A silica-forming source can be any silica or compound that converts to silica during heating, including, for example, fused silica or other amorphous silica, quartz, Tripoli, diatomaceous silica, $Si(OR)_4$ compounds, or like Si sources, and mixtures or combinations thereof.

Pore Forming Agent

A pore forming agent or pore former is a material, such as a combustible organic compound, polymer, or like material, which can occupy definite bulk or surface space in the body prior to firing, and is vaporized or burns-out of the body during firing to create a pore or cavity structure in the body. The pore forming agent can be, for example, any compound, polymer, copolymer, composite, and like material, or combinations thereof having defined particulate properties. In embodiments an excellent pore former can be, for example, graphite, starch, and like materials, or combinations thereof. In embodiments, the raw material mixture can contain, for example, at least 30 wt % of one or more pore forming agents, such as at least about 40% or at least about 50%, of a pore-forming agent, or a combination of pore-forming agents. Weight percentages of the pore-forming agents are expressed as a super-addition to the cordierite-forming raw materials. Thus, for example, the addition of 50 parts by weight of a pore-forming agent to 100 parts by weight of cordierite-forming raw materials constitutes 50 wt % pore-forming agent. The median particle diameter of a pore forming agent, averaged in proportion to the pore-former's weight percentages of the total, can be for example, less than about 60 microns, such as from about 5 to about 50 microns, or from about 25 to about 45 microns.

Body Formation

In embodiments, the honeycomb body can be formed by, for example, extrusion or injection molding or like processes, and can be fired, for example, at about 1,380 to about 1,440° C. for about 4 to about 40 hours to form a body with at least 80% cordierite. The heating rate for example, in the range of from about 1,200 to about 1,300° C., can be not more than about 75° C./h, not more than about 50° C./h, not more than about 25° C./h, and like heating rates, including intermediate values and ranges thereof.

In embodiments, the raw material mixture can comprise, for example, a talc having an XRD talc morphology index greater than about 0.80 and a median particle diameter of from about 10 to about 25 microns, an alumina-forming source having an average median particle diameter of from about 5 to about 10 microns, at least 10 weight percent of a kaolin having a median particle size of from about 3 to about 11 microns, a silica-forming source having a median particle diameter of from about 10 to about 25 microns, from about 4 to about 12 weight percent of a Laponite® clay containing at least 1.0 wt % $Na_2O$, and at least 40 weight percent pore-forming agent(s) having an average median particle diameter of from about 20 to about 50 microns. According to this embodiment, there can optionally be a super-addition of pore-forming agent of at least about 50 weight percent and the weighted average of the median particle diameters of the pore-forming agent can be, for example, from about 25 to about 40 microns.

The following examples serve to more fully describe the manner of using the above-described disclosure, as well as to further set forth best modes contemplated for carrying out various aspects of the disclosure. It is understood that these examples in no way serve to limit the true scope of this disclosure, but rather are presented for illustrative purposes.

EXAMPLES

Embodiments of the disclosure are further illustrated with reference to the examples and as summarized in the accompanying tables. Table 1 lists relevant properties of the raw materials used to make the examples. Laponite® RD comprises approximately 58.5 wt % $SiO_2$, 27.5 wt % MgO, 3.2 wt % $Na_2O$, and 0.6 wt % $Li_2O$. Tables 2 to 4 list the raw material combinations of the compositions of the comparison and working examples. Tables 5 to 7 list the physical properties of the compositions for comparative and actual working examples. The chemical compositions of some of the fired examples were measured by x-ray fluorescence except for lithium oxide, which was measured by flame emission spectroscopy. The compositions of the other fired examples have been estimated from the compositions of the raw materials, weighted by their mass fractions in the pre-fired body. Specifically, the equations used to estimate the alkali metal oxide and calcium oxide in the fired examples are as follows:

Wt % $Li_2O$ (fired sample)=0.002+0.62{(wt % magnesium silicate clay)/100} EQ. 17

Wt % $Na_2O$ (fired sample)=0.030+10.11{(wt % sodium stearate)/100}+0.10{(wt % talc)/100}+0.25{(wt % aluminum oxide)/100}+0.30{(wt % gibbsite)/100}+0.04{(wt % kaolin)/100}+3.23 {(wt % magnesium silicate clay)/100} EQ. 18

Wt % $K_2O$ (fired sample)=0.025{(wt % magnesium silicate clay)/100}+2.53{(wt % Berset 2700)/100}+0.045{(wt % potato starch)/100}+0.09{(wt % Kaolin A)/100}+0.06{(wt % Kaolin B)/100} EQ. 19

Wt % CaO (fired sample)=0.16{(wt % talc)/100}+0.04{(wt % kaolin)/100}+0.25{(wt % magnesium silicate clay)/100}+0.13{(Berset 2700)/100} EQ. 20

GENERAL PROCEDURE FOR CORDIERITE BODY PREPARATION Inorganic raw materials and optionally pore formers were mixed with 4% to 7% methylcellulose binder and 0.5 wt % of a sodium stearate lubricant, and then water was added to the powder mixture in a stainless steel muller to form a plasticized batch. The sodium stearate, having a nominal chemical formula of $C_{17}H_{35}COONa$, contains 10.11% $Na_2O$ and therefore contributes approximately 0.05 wt % $Na_2O$ to the pre-fired body. Also, Examples 10-18 utilized 3 wt % of a cross-linking agent, Berset 2700, containing approximately 2.53 wt % $K_2O$, thereby contributing approximately 0.075 wt % $K_2O$ to the pre-fired body. Berset 2700 is a solution of a cyclic amide condensate from Bercen, Inc. Batches were extruded as 2-inch and 5.7-inch diameter honeycombs having from about 270 to about 300 cells/inch$^2$ and about 0.014 to about 0.016-inch walls. The extruded ware was dried and then fired in a gas or electric kiln. Heating rates were about 25° C./h from about 1,150 to about 1,350° C. and lastly about 5° C./h from about 1,350 to about 1,409° C., where the samples were held for 11 hours.

CHARACTERIZATION OF CORDIERITE BODIES In the Tables, the mean coefficient of thermal expansion from 25 to 800° C. and from 500 to 900° C., in units of $10^{-7}$/° C., were measured by dilatometry on a specimen parallel to the lengths of the channels of the honeycomb article ("axial direction"). The % porosity is the volume percentage of porosity in the walls of the article as measured by mercury porosimetry. The terms $d_{10}$, $d_{50}$, and $d_{90}$, denote the pore diameters, in microns, or micrometers ($10^{-6}$ meters), at which 10%, 50%, and 90% of the total pore volume are of a finer pore diameter, respectively, also as measured by mercury porosimetry.

Weight percentages of residual mullite, spinel+sapphirine, and alpha-alumina in the fired samples were measured by x-ray diffractometry. The amount of spinel and sapphirine are included together in view of the potential difficulty in distinguishing between the two phases, depending upon the XRD technique used.

The axial XRD I-ratio and transverse XRD I-ratio (I-ratio measured on the as-fired wall surface) are defined by EQ. 1 and were measured by x-ray diffractometry using copper K$\alpha$ radiation. For randomly oriented cordierite crystals, the axial and transverse I-ratios are both equal to about 0.655. Values of the transverse I-ratio greater than about 0.655 and values of the axial I-ratio lower than about 0.655 indicate that the cordierite crystals are preferentially oriented with their z-axes parallel to the plane of the wall.

All modulus of rupture (MOR), or flexural strength, values were measured by the four-point method on a cellular bar (either 1 inch×½ inch×5 inch long, or ½ inch×¼ inch×2.75 inches long) parallel to the axial direction of the honeycomb. Elastic modulus values were measured by a sonic resonance technique also on a cellular bar (1 inch×½ inch×5 inch long) parallel to the axial direction. ASTM C 1198-01 describes a standard test method for high temperature dynamic Young's modulus, shear modulus, and Poisson's ratio for advanced ceramics by sonic resonance. A superior method for determining dynamic Young's modulus and shear modulus is disclosed in co-pending application U.S. Ser. No. 11/823,123 (not yet assigned), filed Jun. 27, 2007 (concurrently herewith), entitled "Methods and Apparatus for Measuring Elastic Modulus of Non-Solid Ceramic Materials by Resonance" to W. P. Dill, et al. In embodiments of the abovementioned copending application there is disclosed a sonic resonance method for measuring the elastic modulus, or Young's modulus, of a non-solid ceramic material which includes the steps of: 1) generating a frequency-controlled electrical signal from an amplifier; 2) transforming the electrical signal into a mechanical signal with a signal transducer, such as a mini-shaker; 3) exposing a non-solid ceramic specimen suspended via a length of silica yarn to the mechanical signal causing the specimen to resonate at a resonance frequency; 4) transmitting the resonance frequency to a pickup transducer via a second length of silica yarn and transforming the resulting resonance vibration signal into an electrical signal with a pickup transducer; 5) measuring the peak resonance frequency; and, 6) calculating the elastic modulus based on the dimensions of the specimen, the measured peak resonance frequency, and the Poisson's ratio of the material.

Cell geometries are listed as "N/w" where "N" is the cell density as number of cells per square inch, and "w" is the channel wall thickness in units of $10^{-3}$ inches. The values of E at tangency and temperature at tangency are the values of $E_i$ and $T_i$ at the point of tangency in EQ. 5.

Table 2 provides the compositions of examples with 0, about 3.7, and about 7.4 weight percent addition of a magnesium silicate clay such as Laponite® RD with two different, but similar, quartz raw materials, and with various amounts of starch pore-formers. Table 3 lists the compositions of examples with 0, about 4, about 8, and about 12 weight percent addition of Laponite® RD with either about 20 wt % graphite+about 20 wt % starch, or about 20 wt % graphite+about 30 wt % starch, calculated as super-additions to the inorganic batch. Table 4 provides examples having about 4 weight percent Laponite® RD with various combinations of cordierite-forming raw materials and about 20 wt % graphite+about 20 wt % starch. The working examples containing Laponite® RD possess greater than about 0.30 wt % total alkali metal oxide such as about 0.39 to about 0.70 wt % total $M_2O$, and contain greater than about 0.40 wt % $M_2O$+CaO, such as about 0.46 to about 0.78 wt % $M_2O$+CaO, and all comparison examples, except for example C3, have less than about 0.30 wt % total $M_2O$ and less than about 0.40 wt % $M_2O$+CaO.

The properties of the fired honeycombs prepared from these raw material combinations are provided in Tables 5 to 7. The additional alkali metal provided by the Laponite® RD generally results in a desirably narrower pore size distribution, as seen by the decrease in the values of $(d_{50}-d_{10})/d_{50}$ and $(d_{90}-d_{10})/d_{50}$ in FIGS. 7 and 8 from the examples of Tables 5 and 6 based upon similar cordierite-forming raw materials. Although the higher alkali contents of the working examples in Tables 5 to 7 cause an increase in CTE, they also yield a substantial increase in strength at a given porosity level (FIG. 3) and a higher strain tolerance, MOR/E (FIG. 4). These improvements in strength and strain tolerance are associated with less microcracking, as shown by the lower values of $E_{900° C.}/E_{25° C.}$ (FIG. 5) and lower values of $Nb^3$ (FIG. 6) of the inventive examples relative to the comparative examples having less than about 0.30 wt % total $M_2O$ and less than about 0.40 wt % $M_2O$+CaO, and by plots of MOR/CFA versus $E_{900° C.}/E_{25}$ (FIG. 10) and MOR/E versus $E_{900° C.}/E_{25}$ (FIG. 11). Consequently, the working examples possess higher strength while maintaining a high predicted thermal shock resistance, TSR (° C.)=500+$(MOR/E)_{25° C.}(CTE_{500-900° C.})^{-1}$, as shown, for example, in FIG. 9.

In one instance, a comparative example with greater than 0.40 wt % $M_2O$+CaO exhibited non-inventive properties; specifically, Comparative Example C3, with approximately 0.46 wt % ($M_2O$+CaO) and 66.2% porosity, exhibited an MOR/CFA value of only 664 psi, less than the lower limit of MOR/CFA=3,500-40(66.2)=852 psi of an inventive body with that % porosity. By comparison, Inventive Example 2, also with about 0.46% ($M_2O$+CaO) and with 68.4% porosity, exhibited an MOR/CFA value of 857 psi. Comparative Example C3 utilized Quartz B in the raw material mixture, whereas Inventive Example 2 used Quartz A. This lower strength of Example C3 demonstrates that the properties of a body having a total $M_2O$+CaO that is close to the lower limit of 0.40 wt % may, in some instances, lie in the non-inventive range, depending upon the choice of raw materials.

The disclosure has been described with reference to various specific embodiments and techniques. However, it should be understood that many variations and modifications are possible while remaining within the spirit and scope of the disclosure.

TABLE 1

Raw material properties

| Raw Material | Supplier | Product Name | Talc XRD Morphology Index | Median Particle Diameter (microns) | Approximate wt % $Li_2O$ | Approximate wt % $Na_2O$ | Approximate wt % $K_2O$ | Approximate wt % CaO |
|---|---|---|---|---|---|---|---|---|
| Talc A | Barretts Minerals | 96-67 | 0.65 | 14 | 0 | 0.10 | 0 | 0.16 |
| Talc B | Luzenac | FCOR, −325 mesh | 0.84 | 22 | 0 | 0.10 | 0 | 0 |
| Alumina A | Almatis | A1000 SGD | — | 0.6 | 0 | 0.25 | 0 | 0 |
| Alumina B | Almatis | A10, −325 | — | 10 | 0 | 0.25 | 0 | 0 |
| Alumina C | Alcan | CAHPF 360 | — | 28 | 0 | 0.25 | 0 | 0 |
| Gibbsite A | Aluchem, Inc. | AC 714 | — | 5 | 0 | 0.30 | 0 | 0 |
| Gibbsite B | Aluchem, Inc. | AC 410 | — | 13 | 0 | 0.30 | 0 | 0 |
| Boehmite | Sasol North America Inc. | Dispal 18N4-80 | — | 0.1 | 0 | 0 | 0 | 0 |
| Kaolin A | IMERYS Minerals Ltd. | Kaopaque 10 | — | 3 | 0 | 0.04 | 0.06 | 0.04 |
| Kaolin B | IMERYS Minerals Ltd. | Hydrite MP | — | 11 | 0 | 0.04 | 0.09 | 0.04 |
| Quartz A | Unimin Corporation | Silver Bond ® 200 | — | 23 | 0 | 0 | 0 | 0 |
| Quartz B | Unimin Corporation | Cerasil 300 | — | 25 | 0 | 0 | 0 | 0 |
| Magnesium Silicate Smectite Clay | Southern Clay Products, Inc. | Laponite ® RD- | — | 0.025 | 0.62 | 3.23 | 0 | 0.25 |
| Graphite | Asbury Carbons | 4602 | — | 35 | 0 | 0 | 0 | 0 |
| Potato Starch A | T. J. Harkins | Potato Starch | — | 49 | 0 | 0 | 0.045 | 0 |
| Potato Starch B | Nishimoto Trading Co, LTD | Katakuriko Potato Starch | — | 45 | 0 | 0 | 0.045 | 0 |

TABLE 2

Batch composition examples with starch and no graphite pore-former

| | Category | | | | | | |
|---|---|---|---|---|---|---|---|
| | Comp. | Comp. | Comp. | Inv. | Comp. | Inv. | Inv. |
| | Example Number | | | | | | |
| | C1 | C2 | C3 | 1 | C4 | 2 | 3 |
| Talc B | 38.52 | 38.52 | 35.14 | 31.87 | 38.52 | 35.14 | 31.87 |
| Alumina B | 12.27 | 12.27 | 12.16 | 12.05 | 12.27 | 12.16 | 12.05 |
| Gibbsite A | 20.99 | 20.99 | 20.99 | 20.99 | 20.99 | 20.99 | 20.99 |
| Kaolin B | 12.84 | 12.84 | 12.84 | 12.84 | 12.84 | 12.84 | 12.84 |
| Quartz A | — | — | | — | 15.38 | 15.13 | 14.88 |
| Quartz B | 15.38 | 15.38 | 15.13 | 14.88 | — | — | — |
| Mg Silicate Clay | 0 | 0 | 3.7 | 7.4 | 0 | 3.7 | 7.4 |
| Graphite | — | — | — | — | — | — | — |
| Potato Starch A | 20.0 | 40.0 | 45.0 | 45.0 | 40.0 | 45.0 | — |
| Potato Starch B | — | — | — | — | — | — | 25.0 |

TABLE 3

Batch composition examples with graphite + starch pore-formers

| Category<br>Example Number | Comp.<br>C5 | Comp.<br>C6 | Comp.<br>C7 | Inv.<br>4 | Inv.<br>5 | Inv.<br>6 | Comp.<br>C8 | Inv.<br>7 | Inv.<br>8 | Inv.<br>9 |
|---|---|---|---|---|---|---|---|---|---|---|
| Talc B | 38.52 | 38.52 | 38.52 | 34.91 | 31.31 | 27.71 | 38.52 | 34.91 | 31.31 | 27.71 |
| Alumina B | 12.27 | 12.27 | 12.27 | 12.15 | 12.03 | 11.91 | 12.27 | 12.15 | 12.03 | 11.91 |
| Gibbsite A | 20.99 | 20.99 | 20.99 | 20.99 | 20.99 | 20.99 | 20.99 | 20.99 | 20.99 | 20.99 |
| Kaolin B | 12.84 | 12.84 | 12.84 | 12.84 | 12.84 | 12.84 | 12.84 | 12.84 | 12.84 | 12.84 |
| Quartz B | 15.38 | 15.38 | 15.38 | 15.11 | 14.83 | 14.55 | 15.38 | 15.11 | 14.83 | 14.55 |
| Mg Silicate Clay | 0 | 0 | 0 | 4.0 | 8.0 | 12.0 | 0 | 4.0 | 8.0 | 12.0 |
| Graphite | 20.0 | 20.0 | 20.0 | 20.0 | 20.0 | 20.0 | 20.0 | 20.0 | 20.0 | 20.0 |
| Potato Starch A | — | 10.0 | 20.0 | 20.0 | 20.0 | 20.0 | 30.0 | 30.0 | 30.0 | 30.0 |

TABLE 4

Batch composition examples with graphite + starch pore-formers

| Category<br>Example Number | Inv.<br>10 | Inv.<br>11 | Inv.<br>12 | Inv.<br>13 | Inv.<br>14 | Inv.<br>15 | Inv.<br>16 | Inv.<br>17 | Inv.<br>18 |
|---|---|---|---|---|---|---|---|---|---|
| Talc A | 38.04 | — | — | — | — | — | — | 34.89 | — |
| Talc B | — | 36.01 | 37.68 | 37.50 | 33.99 | 34.89 | 34.54 | — | 36.01 |
| Alumina A | — | — | — | — | — | 12.13 | 9.47 | — | — |
| Alumina C | — | — | — | — | 4.31 | — | — | 12.13 | — |
| Alumina B | 28.73 | 16.52 | 26.07 | 23.56 | — | — | — | — | 16.52 |
| Gibbsite A | — | — | — | — | — | 21.50 | — | — | — |
| Gibbsite B | — | 10.75 | — | — | 21.50 | — | 21.50 | 21.50 | 10.75 |
| Boehmite | — | 3.00 | — | 6.00 | 6.00 | — | — | — | 3.00 |
| Kaolin B | 12.00 | — | 18.00 | — | 18.00 | — | 18.00 | — | — |
| Kaolin A | — | 15.00 | — | 12.00 | — | 12.00 | — | 12.00 | 15.00 |
| Quartz B | 17.23 | 14.72 | 14.25 | 16.94 | 12.20 | 15.48 | 12.49 | 15.48 | 14.72 |
| Mg Silicate Clay | 4.0 | 4.0 | 4.0 | 4.0 | 4.0 | 4.0 | 4.0 | 4.0 | 4.0 |
| Graphite | 20.0 | 20.0 | 20.0 | 20.0 | 20.0 | 20.0 | 20.0 | 20.0 | 20.0 |
| Potato Starch A | 20.0 | 20.0 | 20.0 | 20.0 | 20.0 | 20.0 | 20.0 | 20.0 | 20.0 |

TABLE 5

Examples with starch and no graphite pore-former

| Category<br>Example Number | Comp.<br>C1 | Comp.<br>C2 | Comp.<br>C3 | Inv.<br>1 | Comp.<br>C4 | Inv.<br>2 | Inv.<br>3 |
|---|---|---|---|---|---|---|---|
| Wt % Mg Silicate Clay | 0.0 | 0.0 | 3.7 | 7.4 | 0.0 | 3.7 | 7.4 |
| % Porosity | 60.4 | 62.6 | 66.2 | 64.2 | 67.0 | 68.4 | 59.5 |
| $d_{10}$ | 5.2 | 6.8 | 9.3 | 11.5 | 10.7 | 8.6 | 10.0 |
| $d_{50}$ | 15.6 | 13.9 | 15.6 | 18.4 | 20.2 | 17.7 | 17.3 |
| $d_{90}$ | 30.9 | 31.1 | 29.8 | 35.7 | 36.8 | 30.2 | 27.3 |
| $(d_{50} - d_{10})/d_{50}$ | 0.67 | 0.51 | 0.40 | 0.38 | 0.47 | 0.52 | 0.42 |
| $(d_{90} - d_{10})/d_{50}$ | 1.65 | 1.75 | 1.31 | 1.31 | 1.30 | 1.22 | 1.00 |
| MPCF = % Porosity/$[(d_{90} - d_{10})/d_{50}]$ | 37 | 36 | 50 | 49 | 52 | 56 | 60 |
| CTE, 25-800° C. ($10^{-7}$/° C.) | 8.2 | 5.4 | 8.1 | 9.9 | 7.9 | 8.9 | 8.1 |
| CTE, 500-900° C. ($10^{-7}$/° C.) | 14.5 | 12.4 | 15.3 | 17.2 | 15.1 | 16.1 | 15.6 |
| Transverse I-ratio | — | 0.87 | 0.82 | 0.84 | 0.84 | 0.81 | 0.85 |
| Axial I-ratio | — | 0.41 | 0.46 | 0.44 | 0.44 | 0.48 | 0.41 |

TABLE 5-continued

| Examples with starch and no graphite pore-former | | | | | | | |
|---|---|---|---|---|---|---|---|
| Category<br>Example Number | Comp.<br>C1 | Comp.<br>C2 | Comp.<br>C3 | Inv.<br>1 | Comp.<br>C4 | Inv.<br>2 | Inv.<br>3 |
| % Mullite | — | 1.2 | 0 | 0.8 | 0.8 | 1.2 | — |
| % Spinel + Sapphirine | — | 1.2 | 1.5 | 1.9 | 2.9 | 2.3 | — |
| % Alumina | — | 0 | 0 | 0 | 0 | 0 | — |
| Cell Geometry | 270/16 | 299/16 | 301/15 | 299/16 | 275/14 | 275/14 | 275/14 |
| CFA | 0.457 | 0.477 | 0.45 | 0.477 | 0.410 | 0.410 | 0.410 |
| MOR (psi) | 333 | 240 | 299 | 498 | 274 | 351 | 650 |
| MOR/CFA (psi) | 729 | 502 | 664 | 1045 | 668 | 857 | 1586 |
| $E_{25° C.}$ ($10^5$ psi) | — | 2.70 | 2.74 | 3.69 | 2.80 | 3.14 | 6.45 |
| $E_{900° C.}$ ($10^5$ psi) | — | 2.85 | 2.75 | 3.55 | — | — | — |
| $E_{900° C.}/E_{25° C.}$ | — | 1.06 | 1.0 | 0.96 | — | — | — |
| $E°_{25° C.}$ ($10^5$ psi) | — | 3.54 | 3.11 | 3.94 | — | — | — |
| E at tangency ($10^5$ psi) | — | 3.33 | 2.96 | 3.76 | — | — | — |
| Temperature at tangency (° C.) | — | 868 | 731 | 672 | — | — | — |
| Microcrack Parameter, $Nb^3$ | — | 0.178 | 0.078 | 0.040 | — | — | — |
| Strain Tolerance, MOR/E | — | 0.089% | 0.109% | 0.135% | 0.098% | 0.112% | 0.101% |
| TSP (° C.) | — | 718 | 713 | 785 | 649 | 694 | 646 |
| TSR = TSP + 500 (° C.) | — | 1218 | 1213 | 1285 | 1149 | 1194 | 1146 |
| Weight percentages of metal oxides in fired samples | | | | | | | |
| Estimated or Measured | Est. | Meas. | Est. | Meas. | Est. | Est. | Est. |
| MgO | — | 13.17 | — | 13.16 | — | — | — |
| $Al_2O_3$ | — | 34.9 | — | 34.9 | — | — | — |
| $SiO_2$ | — | 49.6 | — | 49.7 | — | — | — |
| $Fe_2O_3$ | — | 1.21 | — | 0.98 | — | — | — |
| $TiO_2$ | — | 0.14 | — | 0.14 | — | — | — |
| $Li_2O$ | 0.002 | 0.002 | 0.025 | 0.055 | 0.002 | 0.025 | 0.048 |
| $Na_2O$ | 0.22 | 0.19 | 0.33 | 0.46 | 0.22 | 0.33 | 0.45 |
| $K_2O$ | 0.021 | 0.030 | 0.033 | 0.034 | 0.030 | 0.033 | 0.025 |
| CaO | 0.067 | 0.067 | 0.071 | 0.073 | 0.067 | 0.071 | 0.075 |
| Total $M_2O$ | 0.24 | 0.22 | 0.39 | 0.55 | 0.25 | 0.39 | 0.52 |
| Total $M_2O$ + CaO | 0.31 | 0.29 | 0.46 | 0.62 | 0.32 | 0.46 | 0.60 |

TABLE 6

| Examples with graphite + starch pore-formers | | | | | | | | | | |
|---|---|---|---|---|---|---|---|---|---|---|
| Category<br>Example Number | Comp.<br>C5 | Comp.<br>C6 | Comp.<br>C7 | Inv.<br>4 | Inv.<br>5 | Inv.<br>6 | Comp.<br>C8 | Inv.<br>7 | Inv.<br>8 | Inv.<br>9 |
| Wt % Mg Silicate Clay | 0.0 | 0.0 | 0.0 | 4.0 | 8.0 | 12.0 | 0.0 | 4.0 | 8.0 | 12.0 |
| % Porosity | 57.0 | 61.5 | 65.9 | 61.0 | 61.4 | 60.3 | 67.6 | 65.3 | 63.8 | 63.4 |
| $d_{10}$ | 5.0 | 6.4 | 8.0 | 8.5 | 9.6 | 10.8 | 8.9 | 9.7 | 10.5 | 12.1 |
| $d_{50}$ | 12.6 | 15.9 | 17.6 | 16.7 | 16.8 | 17.1 | 17.1 | 17.8 | 18.2 | 19.3 |
| $d_{90}$ | 30.5 | 31.4 | 34.1 | 33.7 | 30.1 | 31.3 | 32.2 | 34.8 | 29.5 | 33.6 |
| $(d_{50} - d_{10})/d_{50}$ | 0.60 | 0.60 | 0.55 | 0.49 | 0.43 | 0.37 | 0.48 | 0.46 | 0.42 | 0.37 |
| $(d_{90} - d_{10})/d_{50}$ | 2.02 | 1.58 | 1.49 | 1.51 | 1.22 | 1.20 | 1.36 | 1.41 | 1.05 | 1.11 |
| MPCF = % Porosity/ $[(d_{90} - d_{10})/d_{50}]$ | 28 | 39 | 44 | 40 | 50 | 50 | 50 | 46 | 61 | 57 |
| CTE, 25-800° C. ($10^{-7}$/° C.) | 6.2 | 7.0 | 7.0 | 8.6 | 9.8 | 11.3 | 7.8 | 9.6 | 11.0 | 12.1 |
| CTE, 500-900° C. ($10^{-7}$/° C.) | 13.6 | 14.6 | 14.4 | 15.8 | 16.9 | 18.2 | 15.1 | 16.7 | 17.8 | 18.8 |
| Transverse I-ratio | 0.88 | — | 0.86 | 0.85 | 0.85 | 0.84 | — | — | — | — |
| Axial I-ratio | 0.34 | — | 0.38 | 0.39 | 0.39 | 0.40 | — | — | — | — |
| % Mullite | 1.3 | — | 1.1 | 0.8 | 0.5 | 0 | — | — | — | — |
| % Spinel + Sapphirine | 1.7 | — | 1.7 | 1.8 | 2.2 | 2.7 | — | — | — | — |
| % Alumina | 0 | — | 0 | 0 | 0 | 0 | — | — | — | — |
| Cell Geometry | 270/16 | 270/16 | 270/16 | 270/16 | 270/16 | 270/16 | 270/16 | 270/16 | 270/16 | 270/16 |
| CFA | 0.457 | 0.457 | 0.457 | 0.457 | 0.457 | 0.457 | 0.457 | 0.457 | 0.457 | 0.457 |
| MOR (psi) | 333 | 451 | 337 | 509 | 696 | 903 | 227 | 468 | 586 | 731 |
| MOR/CFA (psi) | 729 | 987 | 738 | 1114 | 1522 | 1977 | 492 | 1018 | 1275 | 1588 |
| $E_{25° C.}$ ($10^5$ psi) | — | — | 3.37 | 4.42 | 5.70 | 6.89 | — | — | — | — |
| $E_{900° C.}$ ($10^5$ psi) | — | — | 3.42 | 4.38 | 5.52 | 6.60 | — | — | — | — |
| $E_{900° C.}/E_{25° C.}$ | — | — | 1.01 | 0.99 | 0.97 | 0.96 | — | — | — | — |
| $E°_{25° C.}$ ($10^5$ psi) | — | — | 3.98 | 5.00 | 6.21 | 7.37 | — | — | — | — |
| E at tangency ($10^5$ psi) | — | — | 3.75 | 4.72 | 5.90 | 7.01 | — | — | — | — |
| Temperature at tangency (° C.) | — | — | 851 | 774 | 692 | 667 | — | — | — | — |
| Microcrack Parameter, $Nb^3$ | — | — | 0.104 | 0.074 | 0.051 | 0.039 | — | — | — | — |
| MOR/E | — | — | 0.100% | 0.115% | 0.122% | 0.131% | — | — | — | — |

TABLE 6-continued

| Examples with graphite + starch pore-formers | | | | | | | | | | |
|---|---|---|---|---|---|---|---|---|---|---|
| Category<br>Example Number | Comp.<br>C5 | Comp.<br>C6 | Comp.<br>C7 | Inv.<br>4 | Inv.<br>5 | Inv.<br>6 | Comp.<br>C8 | Inv.<br>7 | Inv.<br>8 | Inv.<br>9 |
| TSP (° C.) | — | — | 695 | 731 | 720 | 720 | — | — | — | — |
| TSR = TSP + 500 (° C.) | — | — | 1195 | 1231 | 1220 | 1220 | — | — | — | — |
| Weight percentages of metal oxides in fired samples | | | | | | | | | | |
| Estimated or Measured | Est. | Est. | Meas. | Meas. | Meas. | Meas. | Est. | Est. | Est. | Est. |
| MgO | — | — | 13.18 | 13.12 | 13.15 | 13.07 | — | — | — | — |
| $Al_2O_3$ | — | — | 34.9 | 34.9 | 34.8 | 34.7 | — | — | — | — |
| $SiO_2$ | — | — | 49.7 | 49.6 | 49.7 | 49.5 | — | — | — | — |
| $Fe_2O_3$ | — | — | 1.17 | 1.01 | 1.04 | 0.89 | — | — | — | — |
| $TiO_2$ | — | — | 0.13 | 0.14 | 0.14 | 0.14 | — | — | — | — |
| $Li_2O$ | 0.002 | 0.002 | 0.001 | 0.030 | 0.054 | 0.073 | 0.002 | 0.027 | 0.052 | 0.076 |
| $Na_2O$ | 0.22 | 0.22 | 0.24 | 0.35 | 0.48 | 0.60 | 0.22 | 0.34 | 0.47 | 0.59 |
| $K_2O$ | 0.012 | 0.016 | 0.021 | 0.022 | 0.023 | 0.024 | 0.025 | 0.026 | 0.027 | 0.028 |
| CaO | 0.067 | 0.067 | 0.067 | 0.072 | 0.073 | 0.078 | 0.067 | 0.071 | 0.075 | 0.079 |
| Total $M_2O$ | 0.23 | 0.24 | 0.26 | 0.40 | 0.56 | 0.70 | 0.24 | 0.40 | 0.55 | 0.70 |
| Total $M_2O$ + CaO | 0.30 | 0.30 | 0.33 | 0.47 | 0.63 | 0.78 | 0.31 | 0.47 | 0.62 | 0.78 |

TABLE 7

| Examples with graphite + starch pore-formers with 4 wt % sodium-containing magnesium silicate clay | | | | | | | | | |
|---|---|---|---|---|---|---|---|---|---|
| Category<br>Example Number | Inv.<br>10 | Inv.<br>11 | Inv.<br>12 | Inv.<br>13 | Inv.<br>14 | Inv.<br>15 | Inv.<br>16 | Inv.<br>17 | Inv.<br>18 |
| Wt % Mg Silicate Clay | 4.0 | 4.0 | 4.0 | 4.0 | 4.0 | 4.0 | 4.0 | 4.0 | 4.0 |
| % Porosity | 63.0 | 64.1 | 63.2 | 62.8 | 64.1 | 62.0 | 61.9 | 63.5 | 62.4 |
| $d_{10}$ | 16.0 | 11.8 | 16.4 | 11.3 | 9.9 | 7.8 | 10.1 | 15.0 | 11.6 |
| $d_{50}$ | 26.5 | 23.4 | 25.9 | 21.6 | 20.3 | 16.2 | 15.7 | 31.8 | 21.3 |
| $d_{90}$ | 49.0 | 41.1 | 48.0 | 40.5 | 40.1 | 28.8 | 28.7 | 60.7 | 38.4 |
| $(d_{50} - d_{10})/d_{50}$ | 0.40 | 0.50 | 0.37 | 0.48 | 0.51 | 0.52 | 0.36 | 0.53 | 0.46 |
| $(d_{90} - d_{10})/d_{50}$ | 1.25 | 1.25 | 1.22 | 1.35 | 1.49 | 1.29 | 1.18 | 1.44 | 1.26 |
| MPCF = % Porosity/ $[(d_{90} - d_{10})/d_{50}]$ | 51 | 51 | 52 | 46 | 43 | 48 | 52 | 44 | 49 |
| CTE, 25-800° C. ($10^{-7}$/° C.) | 14.1 | 13.1 | 13.4 | 12.4 | 12.0 | 11.5 | 10.9 | 16.8 | 10.3 |
| CTE, 500-900° C. ($10^{-7}$/° C.) | 21.1 | 20.1 | 19.1 | 19.3 | 19.1 | 18.7 | 18.2 | 24.6 | 19.9 |
| Transverse I-ratio | — | 0.78 | 0.78 | — | — | 0.82 | 0.82 | 0.74 | — |
| Axial I-ratio | — | 0.48 | 0.48 | — | — | 0.43 | 0.44 | 0.46 | — |
| % Mullite | — | 1.0 | 0.0 | — | — | 1.0 | 1.3 | 0.0 | — |
| % Spinel + Sapphirine | — | 2.9 | 3.8 | — | — | 1.9 | 1.7 | 3.6 | — |
| % Alumina | — | 0.0 | 0.0 | — | — | 0.0 | 0.0 | 0.0 | — |
| Cell Geometry | 270/16 | 270/16 | 270/16 | 270/16 | 270/16 | 270/16 | 270/16 | 270/16 | 270/16 |
| CFA | 0.457 | 0.457 | 0.457 | 0.457 | 0.457 | 0.457 | 0.457 | 0.457 | 0.457 |
| MOR (psi) | 530 | 514 | 474 | 567 | 535 | 656 | 585 | 487 | 634 |
| MOR/CFA (psi) | 1159 | 1124 | 1038 | 1241 | 1170 | 1436 | 1279 | 1066 | 1388 |
| $E_{25° C.}$ ($10^5$ psi) | 3.48 | 4.02 | 3.35 | 4.38 | 4.55 | 5.66 | 4.99 | 3.72 | 5.01 |
| $E_{900° C.}$ ($10^5$ psi) | 3.31 | 3.90 | 3.25 | 4.25 | 4.41 | 5.51 | 4.92 | 3.51 | 4.84 |
| $E_{900° C.}/E_{25° C.}$ | 0.95 | 0.97 | 0.97 | 0.97 | 0.97 | 0.97 | 0.99 | 0.94 | 0.97 |
| $E°_{25° C.}$ ($10^5$ psi) | 3.70 | 4.30 | 3.59 | 4.73 | 4.92 | 6.19 | 5.64 | 3.86 | 5.33 |
| E at tangency ($10^5$ psi) | 3.45 | 4.05 | 3.37 | 4.46 | 4.65 | 5.87 | 5.39 | 3.64 | 5.05 |
| Temperature at tangency (° C.) | 938 | 784 | 840 | 802 | 765 | 709 | 619 | 781 | 749 |
| Microcrack Parameter, $Nb^3$ | 0.036 | 0.038 | 0.041 | 0.045 | 0.046 | 0.052 | 0.074 | 0.021 | 0.036 |
| MOR/E | 0.152% | 0.128% | 0.142% | 0.130% | 0.118% | 0.116% | 0.117% | 0.149% | 0.127% |
| TSP (° C.) | 722 | 637 | 741 | 672 | 617 | 620 | 643 | 533 | 636 |
| TSR = TSP + 500 (° C.) | 1222 | 1137 | 1241 | 1172 | 1117 | 1120 | 1143 | 1107 | 1136 |
| Weight percentages of metal oxides in fired samples | | | | | | | | | |
| Estimated or Measured | Est. | Est. | Meas. | Est. | Est. | Meas. | Est. | Est. | Est. |
| MgO | — | — | 13.18 | — | — | 13.28 | — | — | — |
| $Al_2O_3$ | — | — | 35.0 | — | — | 34.8 | — | — | — |
| $SiO_2$ | — | — | 49.7 | — | — | 49.9 | — | — | — |
| $Fe_2O_3$ | — | — | 1.10 | — | — | 1.10 | — | — | — |

TABLE 7-continued

| Examples with graphite + starch pore-formers with 4 wt % sodium-containing magnesium silicate clay | | | | | | | | | |
|---|---|---|---|---|---|---|---|---|---|
| Category<br>Example Number | Inv.<br>10 | Inv.<br>11 | Inv.<br>12 | Inv.<br>13 | Inv.<br>14 | Inv.<br>15 | Inv.<br>16 | Inv.<br>17 | Inv.<br>18 |
| $TiO_2$ | — | — | 0.16 | — | — | 0.14 | — | — | — |
| $Li_2O$ | 0.027 | 0.027 | 0.024 | 0.027 | 0.027 | 0.031 | 0.027 | 0.027 | 0.027 |
| $Na_2O$ | 0.32 | 0.32 | 0.29 | 0.31 | 0.33 | 0.35 | 0.34 | 0.34 | 0.32 |
| $K_2O$ | 0.097 | 0.095 | 0.100 | 0.093 | 0.102 | 0.093 | 0.102 | 0.093 | 0.095 |
| CaO | 0.080 | 0.078 | 0.074 | 0.079 | 0.075 | 0.075 | 0.076 | 0.075 | 0.078 |
| Total $M_2O$ | 0.45 | 0.45 | 0.41 | 0.43 | 0.45 | 0.47 | 0.47 | 0.46 | 0.45 |
| Total $M_2O$ + CaO | 0.53 | 0.52 | 0.49 | 0.51 | 0.53 | 0.55 | 0.54 | 0.54 | 0.52 |

We claim:

1. A cordierite honeycomb body comprising:

a wt % ($M_2O$+CaO) of not less than about 0.40%;

a MOR/CFA ratio (psi) of at least about 3,500-40(%porosity);

a porosity of at least 45%;

a TSP of at least 500° C.; and wherein the porosity has a pore size distribution characterized by a value of $(d_{50}-d_{10})/d_{50}$ of ≦0.45, where "wt % ($M_2O$+CaO)" is the quantity (wt % $Li_2O$+wt % $Na_2O$+wt % $K_2O$+wt % CaO+wt % $Rb_2O$+wt % $Cs_2O$), TSP is the thermal shock parameter defined as $(MOR/E)_{25° C.}(CTE_{500\text{-}900° C.})^{-1}$, MOR is the four-point modulus of rupture, E is the elastic modulus, CTE is the coefficient of thermal expansion, CFA is the closed frontal area, and the terms $d_{10}$ and $d_{50}$ denote the pore diameters, in micrometers, at which about 10% and about 50%, respectively, of the total pore volume are of a finer pore diameter.

2. The body of claim 1 having a microcrack parameter, $Nb^3$, of ≦0.08 and a $E_{900C}/E_{25C}$ ratio upon heating of ≦1.0.

3. The body of claim 1 having a microcrack parameter, $Nb^3$, of ≦0.06 and a $E_{900C}/E_{25C}$ ratio upon heating of ≦0.98.

4. The body of claim 1 having a microcrack parameter, $Nb^3$, of ≦0.04 and a $E_{900C}/E_{25C}$ ratio upon heating of ≦0.96.

5. The body of claim 1 having an axial XRD I-ratio of ≦0.50.

6. The body of claim 1 wherein the MOR/CFA ratio is at least 800 psi and the TSP is at least 600° C.

7. The body of claim 1 wherein the MOR/CFA ratio is at least 1,000 psi and the TSP is at least 650° C.

8. The body of claim 1 wherein the MOR/CFA ratio is at least 1,200 psi and the TSP is at least 700° C.

9. The body of claim 1 wherein the $E_{900C}/E_{25C}$ ratio upon heating is ≦0.98.

* * * * *